(12) United States Patent
Shimada et al.

(10) Patent No.: US 8,866,961 B2
(45) Date of Patent: Oct. 21, 2014

(54) IMAGE PICKUP APPARATUS

(75) Inventors: Yoshinao Shimada, Hino (JP);
Kazuhiro Haneda, Hachioji (JP);
Makoto Ikeda, Kunitachi (JP)

(73) Assignee: Olympus Imaging Corp., Tokyo (JP)

( * ) Notice: Subject to any disclaimer, the term of this patent is extended or adjusted under 35 U.S.C. 154(b) by 98 days.

(21) Appl. No.: 13/551,389

(22) Filed: Jul. 17, 2012

(65) Prior Publication Data

US 2013/0057754 A1    Mar. 7, 2013

(30) Foreign Application Priority Data

Sep. 6, 2011   (JP) .................................. 2011-194250

(51) Int. Cl.
*H04N 5/238*      (2006.01)
*H04N 5/355*      (2011.01)
*H04N 5/3745*    (2011.01)

(52) U.S. Cl.
CPC ....... *H04N 5/35581* (2013.01); *H04N 5/37452* (2013.01); *H04N 5/3745* (2013.01)
USPC ........................................................ 348/367

(58) Field of Classification Search
CPC .............. H04N 5/2353; H04N 5/2254; H04N 5/23248; H04N 5/2352; H04N 5/235; H04N 5/335
USPC ............. 348/221.1, 222.1, 229.1, 230.1, 294, 348/295, 296, 297, 308, 318, 362, 367; 382/254, 274, 294
See application file for complete search history.

(56) References Cited

U.S. PATENT DOCUMENTS

| | | | | |
|---|---|---|---|---|
| 5,420,629 | A | * | 5/1995 | Watanabe .................. 348/230.1 |
| 5,946,033 | A | * | 8/1999 | Mooney et al. .............. 348/312 |
| 6,078,037 | A | * | 6/2000 | Booth, Jr. ................... 250/208.1 |
| 7,386,228 | B2 | * | 6/2008 | Okada .......................... 396/238 |
| 7,667,176 | B2 | * | 2/2010 | Olsen et al. ................ 250/208.1 |
| 2004/0145673 | A1 | * | 7/2004 | Washisu ........................ 348/364 |
| 2007/0285527 | A1 | * | 12/2007 | Kusayama et al. ......... 348/222.1 |
| 2010/0073516 | A1 | * | 3/2010 | Minakuti et al. ........... 348/229.1 |

FOREIGN PATENT DOCUMENTS

JP         2011-004353         1/2011

* cited by examiner

*Primary Examiner* — Lin Ye
*Assistant Examiner* — Chriss Yoder, III
(74) *Attorney, Agent, or Firm* — John C. Pokotylo; Straub & Pokotylo

(57) ABSTRACT

The invention relates to an image pickup apparatus including a pixel section in which plural pixels are arrayed two-dimensionally, an exposure amount control section that determines an exposure amount and controls the pixel section to be continuously exposed plural times, a memory section that can store a pixel signal from the pixel section for plural frames of an output image, a vertical scanning circuit that reads out the pixel signal of the pixel section and stores the pixel signal in the memory section, and a column processing section that reads out the pixel signal stored in the memory section. The vertical scanning circuit sequentially reads out respective pixel signals related to the plural times of exposures and stores the pixel signals in the memory section.

2 Claims, 25 Drawing Sheets

IMAGE PICKUP APPARATUS

This application claims benefit of Japanese Application No. 2011-194250 filed in Japan on Sep. 6, 2011, the contents of which are incorporated by this reference.

BACKGROUND OF THE INVENTION

1. Field of the Invention

The present invention relates to an image pickup apparatus and, more specifically, to an image pickup apparatus that can acquire image data for obtaining a high dynamic range image.

2. Description of the Related Art

A technique is known for combining plural images in different exposure times (e.g., two images in a short exposure and a long exposure) to obtain an image in a wide dynamic range exceeding a dynamic range obtained only with one image (a high dynamic range image).

An example of such a technique is explained with reference to FIGS. 26 to 28. FIG. 26 is a diagram showing an example of a configuration of a conventional image pickup section. FIG. 27 is a circuit diagram showing a configuration of one pixel in the conventional image pickup section. FIG. 28 is a timing chart showing a state in which a long exposure image and a short exposure image are alternately acquired frame by frame by the conventional image pickup section.

A conventional image pickup section 91 shown in FIG. 26 includes a pixel section 92 in which plural pixels are arrayed two-dimensionally (e.g., in a row direction and a column direction), a readout section 93 that reads out a pixel value from the pixel section 92 in a row unit and performs correlated double sampling with a CDS section and amplifying the pixel value with a gain section, and a digital processing section 94 that reads out a pixel value from the readout section 93 in a row unit and converts the pixel value into a digital signal.

As shown in FIG. 27, the pixel included in the pixel section 92 includes a PD (photodiode), which is a photoelectric conversion section, and an FD (floating diffusion), which is a signal accumulating section, that temporarily stores a signal of the photoelectric conversion section PD at the time of charge readout.

A transfer transistor TX for transferring the signal of the photoelectric conversion section PD to the signal accumulating section FD is connected in series between the photoelectric conversion section PD and the signal accumulating section FD.

TrA represents an amplification transistor functioning as an amplifying section. The amplification transistor TrA, a voltage source Vdd, and a current source configure a source follower amplifier. A signal of the signal accumulating section FD is amplified by the amplification transistor TrA and outputted to a vertical transfer line via a selection transistor to which a selection pulse is applied.

FDRST represents an FD reset transistor for resetting the signal accumulating section FD and an input section of the amplification transistor TrA. The FD reset transistor FDRST and the transfer transistor TX are simultaneously turned on, whereby reset of the photoelectric conversion section PD can also be simultaneously performed.

FIG. 28 shows a state in which a long exposure image and a short exposure image are alternately acquired frame by frame by the image pickup section having such a configuration.

For example, the image pickup section 91 performs readout of exposure data in a long exposure time TexpL in a certain frame. Exposure is a rolling shutter type. The image pickup section 91 resets the PD to set a long exposure time prior to readout timing. Thereafter, the image pickup section 91 sequentially performs readout of data from the pixel section 92 in a row unit at a rising edge of a vertical synchronization signal VD. The exposure is sequentially completed in a row unit simultaneously with the readout in the row unit. Consequently, a data output L related to long exposure is obtained from the image pickup section 91.

In the next frame, the image pickup section 91 performs readout of exposure data in a short exposure time TexpS. The image pickup section 91 sequentially performs readout of data from the pixel section 92 in a row unit at timing of a rising edge of the vertical synchronization signal VD. A data output S related to the short exposure is obtained from the image pickup section 91.

By repeatedly performing such processing, a long exposure image and a short exposure image are alternately acquired frame by frame. Therefore, a long exposure image obtained in a first frame and a short exposure image obtained in a second frame are subjected to high dynamic range combination, whereby a high dynamic range image for one frame is generated. Similarly, a long exposure image obtained in a third frame and a short exposure image obtained in a fourth frame are subjected to high dynamic range combination, whereby a high dynamic range image for the next one frame is generated. In this way, conventionally, a high dynamic range image at a half frame rate of an image pickup frame rate is acquired.

In the related art of this type, to obtain images in different exposure times, it is necessary to repeat photographing at different exposure timings plural times. Therefore, when a subject is a moving object, positional deviation occurs in the moving object in images exposed at the different timings.

As a technique for coping with such a point, for example, Japanese Patent Application Laid-Open Publication No. 2011-4353 describes an image processing apparatus that specifies common regions in images in different exposure times, calculates a positional deviation correction amount for causing the common regions to coincide with each other, and performs image processing.

In the technique described in Japanese Patent Application Laid-Open Publication No. 2011-4353, in order to perform positional deviation correction, a sophisticated image processing technique such as affine conversion or block matching is necessary. Therefore, it is necessary to perform processing in a computer separate from a camera or provide a sufficient processing function in the camera.

In the related art explained above, for example, when two images are combined, it is necessary to read out two images in order to obtain one combined image. Therefore, if it is attempted to obtain a high dynamic range image in a moving image, for example, when two images are combined, a frame rate is reduced to a half.

SUMMARY OF THE INVENTION

An image pickup apparatus according to an aspect of the present invention is an image pickup apparatus that performs exposure to acquire an image signal, the image pickup apparatus including: a pixel section in which plural pixels which generate signal charges corresponding to an exposure amount are arrayed two-dimensionally; an exposure amount control section that determines an exposure amount of the pixel section; a memory section that can store a pixel signal from the pixel section for plural frames of an output image; a pixel readout control section that reads out the pixel signal of the pixel section and stores the pixel signal in the memory section; and a memory readout control section that reads out the pixel signal stored in the memory section. The exposure amount control section performs control to continuously expose the pixel section to light plural times. The pixel readout control section sequentially reads out respective pixel signals related to the continuous plural times of exposures and stores the pixel signals in the memory section.

The above and other objects, features and advantages of the invention will become more clearly understood from the following description referring to the accompanying drawings.

DETAILED DESCRIPTION OF THE PREFERRED EMBODIMENTS

Figure 1:
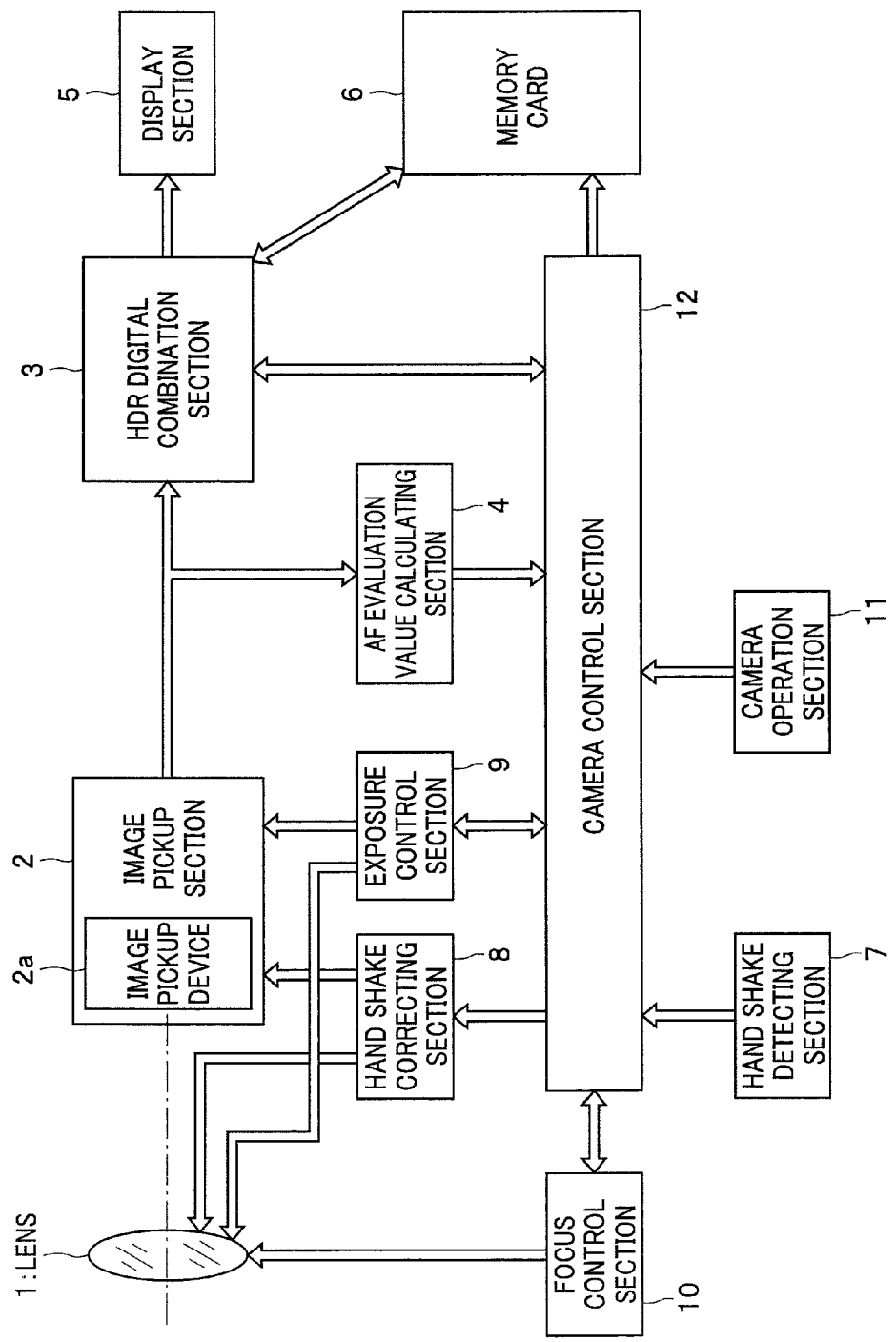
FIG. 1 is a block diagram showing a configuration of an image pickup apparatus in a reference example of the present invention.

First, with reference to FIGS. 1 to 6, a basic configuration of an image pickup device related to an embodiment of the present invention is explained as a reference example. FIG. 1 is a block diagram showing a configuration of an image pickup apparatus.

The image pickup apparatus includes, as shown in FIG. 1, a lens 1, an image pickup section 2, an HDR (High Dynamic Range) digital combination section 3, an AF evaluation value calculating section 4, a display section 5, a hand shake detecting section 7, a hand shake correcting section 8, an exposure control section 9, a focus control section 10, a camera operation section 11, and a camera control section 12. A memory card 6 is also shown in FIG. 1. However, since the memory card 6 is detachably attachable to the image pickup apparatus, the memory card 6 does not have to be a component peculiar to the image pickup apparatus.

The lens 1 focuses an optical image of a subject in an image pickup region of an image pickup device 2a included in the image pickup section 2. The lens 1 includes a focus lens for adjusting a focus position and performing focusing and a diaphragm for controlling a range of a passing light beam. Further, in this example, the lens 1 includes a hand shake correcting function.

The image pickup section 2 includes the image pickup device (an image pickup sensor) 2a that photoelectrically converts the optical image of the subject formed by the lens 1 and outputs the optical image as an image signal and a signal processing circuit that applies analog signal processing to the image signal outputted from the image pickup device 2a and then converts the image signal into a digital signal. In this example, the image pickup device 2a is configured to be movable in a plane perpendicular to a photographing optical axis of the lens 1 and include the hand shake correcting function.

The HDR digital combination section 3 generates a high dynamic range image on the basis of plural images having different exposure amounts outputted from the image pickup section 2 or an image subjected to simple HDR combination in the image pickup section 2.

The AF evaluation value calculating section 4 calculates an AF evaluation value on the basis of an image signal outputted from the image pickup section 2 and outputs the AF evaluation value to the camera control section 12. In other words, the image pickup apparatus is configured to perform autofocus with, for example, contrast AF.

The display section 5 displays the high dynamic range image combined by the HDR digital combination section 3. In other words, the display section 5 is configured to perform high dynamic range live view (LV) and high dynamic range still image display. Further, the display section 5 is configured to also display various kinds of information and the like related to the image pickup apparatus.

The memory card 6 is a recording medium for storing the high dynamic range image combined by the HDR digital combination section 3.

The hand shake detecting section 7 includes an acceleration sensor and the like, detects a hand shake of the image pickup apparatus, and outputs the detection result to the camera control section 12.

The hand shake correcting section 8 is a section for moving, on the basis of the control by the camera control section 12, at least one of the lens 1 and the image pickup device 2a to offset the detected hand shake and reduce occurrence of influence of the hand shake on the optical subject image formed in the image pickup region of the image pickup device 2a.

The exposure control section 9 is an image pickup control section that controls, on the basis of shutter speed (exposure time) determined by the camera control section 12 and under the control by the camera control section 12, a device shutter (the device shutter includes a global shutter, that is, a shutter for collectively resetting all pixels of the image pickup device 2a to thereby start exposure for photographing and, after a predetermined exposure time elapses, collectively transferring image signals of all the pixels to end the exposure) of the image pickup device 2a to acquire plural images in different exposure times. Further, the exposure control section 9 is configured to perform, for example, control of the diaphragm included in the lens 1 on the basis of a diaphragm value determined by the camera control section 12. The shutter speed and the diaphragm value are determined by the camera control section 12 on the basis of for example, a program graph conforming to an APEX system using photometry data calculated on the basis of an image signal outputted from the image pickup section 2, sensitivity set by the camera operation section 11, and the like. Therefore, the exposure control section 9 and the camera control section 12 function as an exposure amount control section that determines an exposure amount of a below-mentioned pixel section 21 of the image pickup section 2 and controls the pixel section 21 to be continuously exposed to light plural times. Further, the exposure control section 9 is configured to output driving information of the image pickup device 2a to the camera control section 12.

The focus control section 10 drives the lens 1 in order to adjust a focus. Specifically, the focus control section 10 drives the focus lens included in the lens 1 on the basis of the control by the camera control section 12 that receives the AF evaluation value from the AF evaluation value calculating section 4 and brings the subject image formed on the image pickup device 2a into a focus. Further, the focus control section 10 is configured to output lens driving information such as a lens position to the camera control section 12.

The camera operation section 11 is an operation section for performing various operation inputs to the image pickup apparatus. The camera operation section 11 includes operation members such as a power switch for turning on and off a power supply for the image pickup apparatus, a release button for inputting instructions for still image photographing, moving image photographing, and the like, and mode buttons for setting a still image photographing mode, a moving image photographing mode, a live view mode, a high dynamic range photographing mode, and the like.

The camera control section 12 controls the entire image pickup apparatus including the HDR digital combination section 3, the memory card 6, the hand shake correcting section 8, the exposure control section 9, and the focus control section 10 on the basis of the lens driving information from the focus control section 10, the AF evaluation value from the AF evaluation value calculating section 4, the hand shake information from the hand shake detecting section 7, the operation input from the camera operation section 11, and the like.

Figure 2:
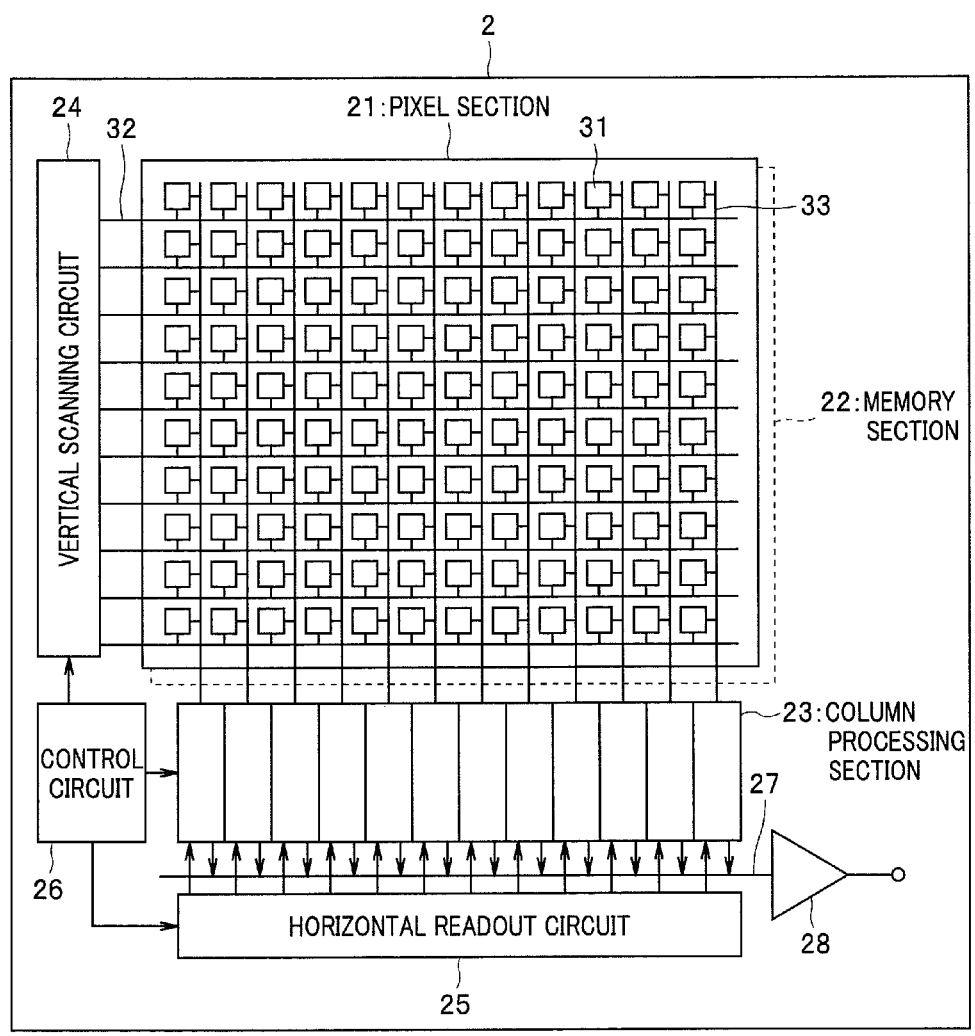
FIG. 2 is a diagram showing a configuration of an image pickup section in the reference example.

FIG. 2 is a diagram showing a configuration of the image pickup section 2.

The image pickup section 2 includes the pixel section 21 including plural pixels 31, a memory section 22, column processing sections 23, a vertical scanning circuit 24, a horizontal readout circuit 25, a control circuit 26, a horizontal signal line 27, and an output amplifier 28. The image pickup device 2a of the image pickup section 2 includes at least the pixel section 21. However, the other circuit elements may be provided in the image pickup device 2a or may be provided outside the image pickup device 2a. Arrangement positions of the respective circuit elements shown in FIG. 2 do not always coincide with actual arrangement positions.

The pixel section 21 is an image pickup region in which the plural pixels 31, which generate signal charges corresponding to an exposure amount, are arrayed two-dimensionally (in a matrix) (in an example shown in FIG. 2, 10 rows×12 columns).

The memory section 22 temporarily accumulates the signal charges of the respective pixels 31 arrayed in the pixel section 21. The memory section 22 includes, for example, memories same in a number or an array as the pixels 31 arrayed in the pixel section 21. For example, in general, a moving image has the number of output pixels smaller than those of a still image (in general, the number of pixels of the moving image is about a number obtained by dividing the number of pixels of the still image by some number). Therefore, the memory section 22 can store, concerning the moving image, pixel signals from the pixel section for plural frames. Further, the memory section 22 can be configured to be capable of storing pixels signals of the still image for plural frames. Embodiments explained below are based on the configuration.

The vertical scanning circuit 24 includes, for example, a shift register and subjects the respective pixels 31 arrayed in the pixel section 21 to driving control in, for example, a row unit or subjects all the pixels 31 to driving control simultaneously (global operation). Therefore, the vertical scanning circuit 24 (or, the control circuit 26 as well) is a pixel readout control section that reads out a pixel signal of the pixel section 21 and stores the pixel signal in the memory section 22. The vertical scanning circuit 24 performs control for sequentially reading out respective pixel signals related to continuous plural times of exposures and storing the pixel signals in the memory section 22. The driving control by the vertical scanning circuit 24 includes control of a reset operation and an accumulating operation for the pixels 31, a signal readout operation from the pixel section 21 to the memory section 22, and the like. In order to perform the driving control, the vertical scanning circuit 24 outputs control signals to the respective pixels 31 via control signal lines 32 provided for the respective rows and independently controls the pixels 31 row by row. For example, the vertical scanning circuit 24 subjects all the pixels 31 of the pixel section 21 to the driving control and transfers pixel signals of all the pixels 31 to the memories of the memory section 22 all at once.

Further, the vertical scanning circuit 24 subjects the memories arrayed in the memory section 22 to the driving control in, for example, a row unit. The driving control includes control for reading out pixel signals from the memories arrayed in the memory section 22 to the column processing sections 23 in, for example, a row unit.

The column processing sections 23 apply signal processing such as noise removal, amplification, and below-mentioned various arithmetic operations to pixel signals outputted from the respective memories of the memory section 22 via a vertical signal line 33 for each column or pixel signals of the pixel section 21 read out by the vertical scanning circuits 24 (or the control circuit 26 as well) and stored in the memory section 22. The column processing sections 23 are pixel readout control sections as well.

The horizontal readout circuit 25 includes, for example, a shift register. The horizontal readout circuit 25 selects a pixel column from which a pixel signal is read out, sequentially selects the column processing sections 23 related to selected pixel columns, and sequentially outputs pixel signals from the column processing sections 23 to the horizontal signal line 27 to thereby read out the pixel signals.

The column processing section 23, the vertical scanning circuit 24, and the horizontal readout circuit 25 (or, the control circuit 26 as well) configure a memory readout control section that reads out the pixel signals stored in the memory section 22.

The output amplifier 28 applies signal processing such as amplification to the pixel signals outputted to the horizontal signal lines 27 and outputs the pixel signals to the outside.

The control circuit 26 generates and outputs, on the basis of the control by the exposure control section 9, clock signals, control signals, and the like as references for the operations of the column processing section 23, the vertical scanning circuit 24, the horizontal readout circuit 25, and the like and controls the column processing section 23, the vertical scanning circuit 24, the horizontal readout circuit 25, and the like.

Figure 3:
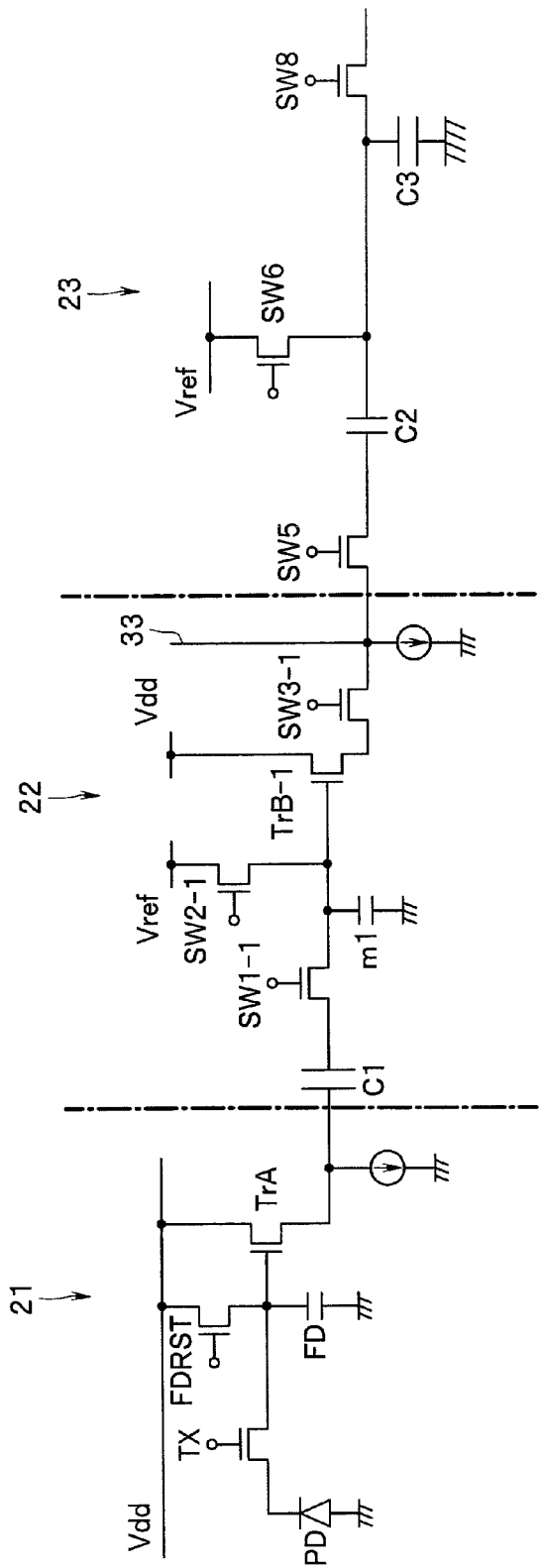
FIG. 3 is a circuit diagram showing a configuration of a pixel section, a memory section, and a column processing section related to one pixel in the reference example.

FIG. 3 is a circuit diagram showing a configuration of the pixel section 21, the memory section 22, and the column processing section 23 related to one pixel.

The pixel 31 of the pixel section 21 includes a PD (photodiode), which is a photoelectric conversion section, and an FD (floating diffusion), which is a signal accumulating section, that temporarily stores a signal of the photoelectric conversion section PD at the time of charge readout. The photoelectric conversion section PD generates a signal charge corresponding to incident light and stores and accumulates the generated signal charge. The signal accumulating section FD is a capacitor that temporarily stores and accumulates the signal charge transferred from the photoelectric conversion section PD. One end of the photoelectric conversion section PD and one end of the signal accumulating section FD are grounded.

Between the other end of the photoelectric conversion section PD and the other end of the signal accumulating section FD, a transfer transistor TX for transferring the signal charge accumulated in the photoelectric conversion section PD to the signal accumulating section FD is connected in series. Specifically, a drain terminal of the transfer transistor TX is connected to the other end of the photoelectric conversion section PD and a source terminal of the transfer transistor TX is connected to the other end of the signal accumulating section FD. A gate terminal, which is an input section, of the transfer transistor TX is connected to the vertical scanning circuit 24. A transfer pulse is supplied to the gate terminal from the vertical scanning circuit 24 and the transfer transistor TX is controlled to be turned on and off.

TrA represents an amplification transistor functioning as an amplifying section. The amplification transistor TrA amplifies a signal, which is based on the signal charge accumulated in the signal accumulating section FD, inputted to a gate terminal and outputs the signal from a source terminal. The drain terminal of the amplification transistor TrA is connected to the voltage source Vdd. The gate terminal, which is an input section, of the amplification transistor TrA is connected to the source terminal of the transfer transistor TX. The source terminal of the amplification transistor TrA is connected to a current source. The amplification transistor TrA, the voltage source Vdd, and the current source configure a source follower amplifier.

FDRST represents an FD reset transistor for resetting the signal accumulating section FD and the input section of the amplification transistor TrA. A drain terminal of the FD reset transistor FDRST is connected to the voltage source Vdd and a source terminal of the FD reset transistor FDRST is connected to the source terminal of the transfer transistor TX. A gate terminal, which is an input section, of the FD reset transistor FDRST is connected to the vertical scanning circuit 24. A FD reset pulse is supplied to the gate terminal from the vertical scanning circuit 24 and the FD reset transistor FDRST is controlled to be turned on and off. In such a configuration, the FD reset transistor FDRST and the transfer transistor TX are simultaneously turned on, whereby reset of the photoelectric conversion section PD can be performed simultaneously with reset of the signal accumulating section FD.

With such a configuration, a signal of the photoelectric conversion section PD is, after being once accumulated in the signal accumulating section FD, amplified by the amplification transistor TrA and outputted to the memory section 22 side.

The memory section 22 includes a capacitor C1, a switch SW1-1, a switch SW2-1, a memory m1, which is an analog memory, a transistor TrB-1, and a switch SW3-1.

One end of the capacitor C1 is connected to the source terminal of the amplification transistor TrA. The capacitor C1 is a capacitor that clamps (fixes) a voltage level of an amplified signal outputted from the amplification transistor TrA. The other end of the capacitor C1 is connected to a drain terminal of the switch SW1-1 including a transistor.

The switch SW1-1 is a transistor that sample-holds a voltage level at the other end of the capacitor C1 and stores and accumulates the voltage level in the memory m1. A gate terminal of the switch SW1-1 is connected to the vertical scanning circuit 24. A sample pulse is supplied to the gate terminal from the vertical scanning circuit 24 and the switch SW1-1 is controlled to be turned on and off.

The switch SW2-1 is a transistor for resetting the memory m1. A source terminal of the switch SW2-1 is connected to a source terminal of the switch SW1-1 and a drain terminal of the switch SW2-1 is connected to a reference voltage Vref. A gate terminal of the switch SW2-1 is connected to the vertical scanning circuit 24. A clamp and memory reset pulse is supplied to the gate terminal from the vertical scanning circuit 24 and the switch SW2-1 is controlled to be turned on and off.

One end of the memory m1 is grounded and the other end of the memory m1 is connected to the source terminal of the switch SW1-1. The memory m1 stores and accumulates an analog signal sample-held by the switch SW1-1. The memory m1 is configured to have a capacity larger than a capacity of the signal accumulating section FD.

The transistor TrB-1 is an amplification transistor functioning as an amplifying section. The transistor TrB-1 amplifies a signal inputted to a gate terminal on the basis of a signal charge accumulated in the memory m1 and outputs the signal from a source terminal. A drain terminal of the transistor TrB-1 is connected to the voltage source Vdd. The gate terminal, which is an input section, of the transistor TrB-1 is connected to the source terminal of the switch SW1-1. The source terminal of the transistor TrB-1 is connected to the current source via the switch SW3-1. The transistor DB-1, the voltage source Vdd, and the current source configure a source follower amplifier.

The switch SW3-1 is a transistor for performing selection for outputting an analog signal of the memory m1 to the vertical signal line 33. The selected signal is transferred to the column processing section 23 via the vertical signal line 33. A drain terminal of the switch SW3-1 is connected to the source terminal of the transistor TrB-1 and a source terminal of the switch SW3-1 is connected to the current source. A gate terminal of the switch SW3-1 is connected to the vertical scanning circuit 24. A selection pulse is supplied to the gate terminal from the vertical scanning circuit 24 and the switch SW3-1 is controlled to be turned on and off.

With such a configuration, a signal from the pixel section 21 is, after once being accumulated in the memory m1, amplified by the transistor DB-1 and outputted to the column processing section 23 side.

The column processing section 23 includes a switch SW5, a capacitor C2, a switch SW6, a capacitor C3, and a switch SW8.

The switch SW5 includes a transistor. A drain terminal of the switch SW5 is connected to the source terminal of the switch SW3-1 and a source terminal of the switch SW5 is connected to one end of the capacitor C2. A gate terminal of the switch SW5 is connected to the control circuit 26. The switch SW5 is controlled to be turned on and off by a pulse supplied from the control circuit 26.

The other end of the capacitor C2 is connected to a source terminal of the switch SW6, the other end of the capacitor C3, and a drain terminal of the switch SW8. The capacitor C2 is a capacitor that clamps (fixes) a voltage level of an amplified signal outputted from the transistor TrB-1 and inputted via the switch SW3-1 and the switch SW5.

The switch SW6 is a transistor for resetting the capacitor C3. A drain terminal of the switch SW6 is connected to the reference voltage Vref. A gate terminal of the switch SW6 is connected to the control circuit 26. The switch SW6 is controlled to be turned on and off by a pulse supplied from the control circuit 26.

One end of the capacitor C3 is grounded and the other end of the capacitor C3 is connected to a source terminal of the switch SW6. The capacitor C3 stores and accumulates an analog signal based on a voltage level of the capacitor C2.

The switch SW8 is a transistor for performing selection for reading out a signal of the capacitor C3 and transferring the signal to the output amplifier 28 via the horizontal signal line 27. The drain terminal of the switch SW8 is connected to the source terminal of the switch SW6 and a source terminal of the switch SW8 is connected to the horizontal signal line 27. A gate terminal of the switch SW8 is connected to the horizontal readout circuit 25. The switch SW8 is controlled to be turned on and off by a pulse supplied from the horizontal readout circuit 25.

In this way, a pixel signal of a column selected by the column processing section 23 is amplified and outputted by the output amplifier 28 at a post stage.

In the image pickup section 2, a not-shown A/D conversion section is further provided at a post stage of the output amplifier 28. A signal from the image pickup section 2 is outputted to the HDR digital combination section 3 after being digitized.

Concerning the transistors explained above, polarities may be reversed to reverse the source terminals and the drain terminals from those explained above. However, in an example explained below, as in the example explained above, the drain terminals are on the input side and the source terminals are on the output side. Further, in the following explanation, the specification that the switches include the transistors is omitted as appropriate.

Figure 4:
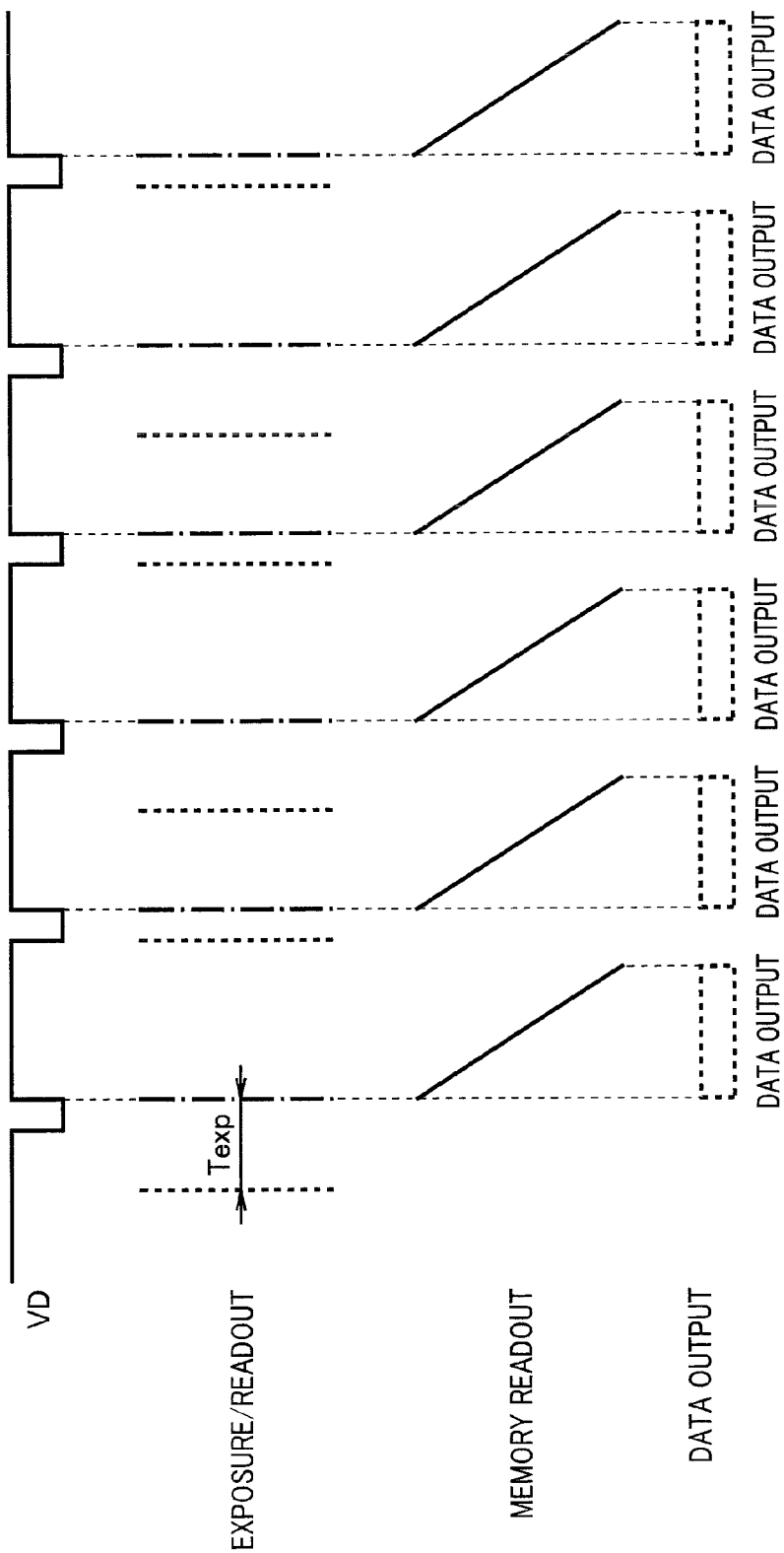
FIG. 4 is a diagram showing a basic image pickup operation of the image pickup section for obtaining a high dynamic range image in the reference example.
Figure 5:
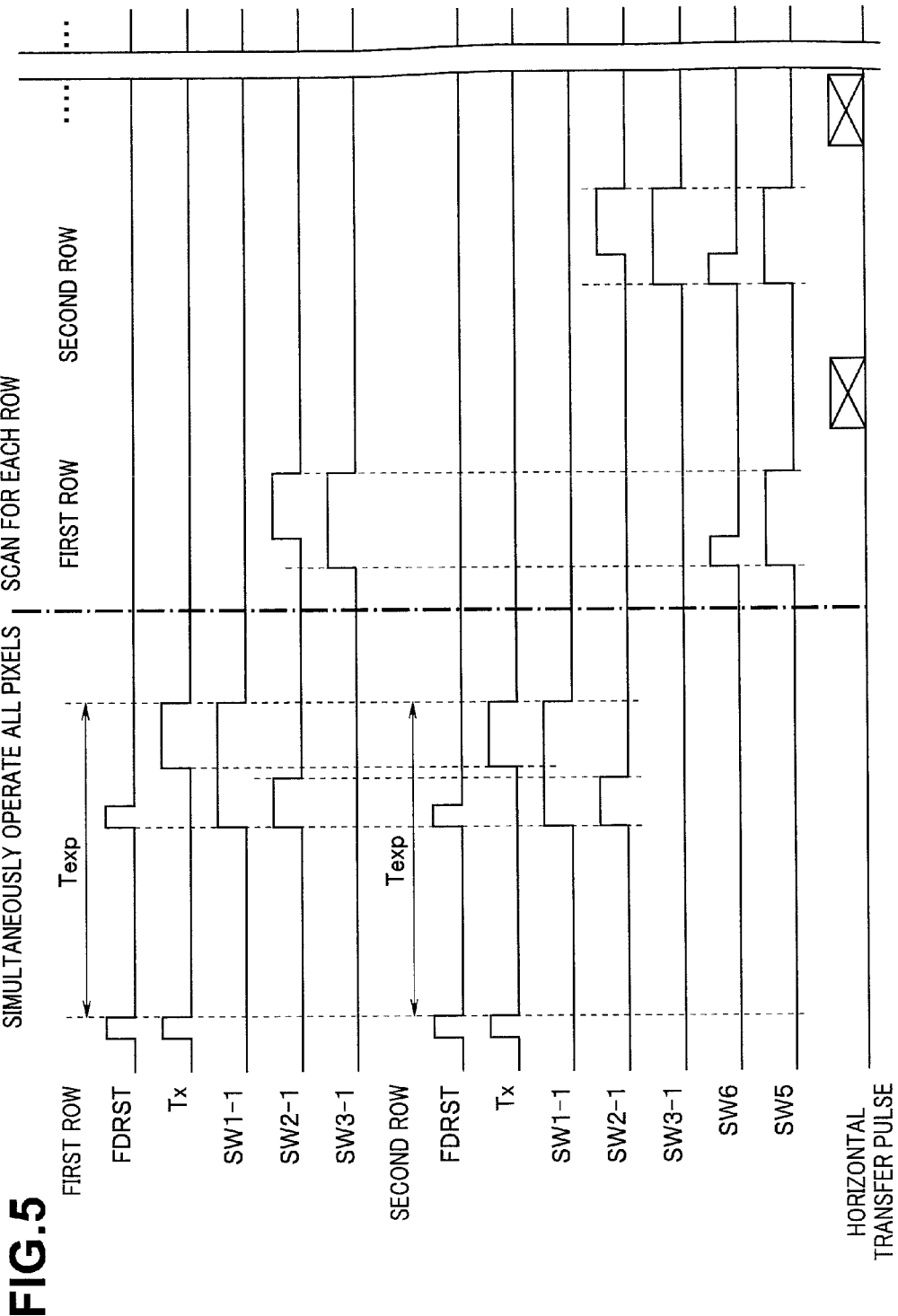
FIG. 5 is a timing chart showing operations in a first row and a second row of the pixel section in the reference example.
Figure 6:
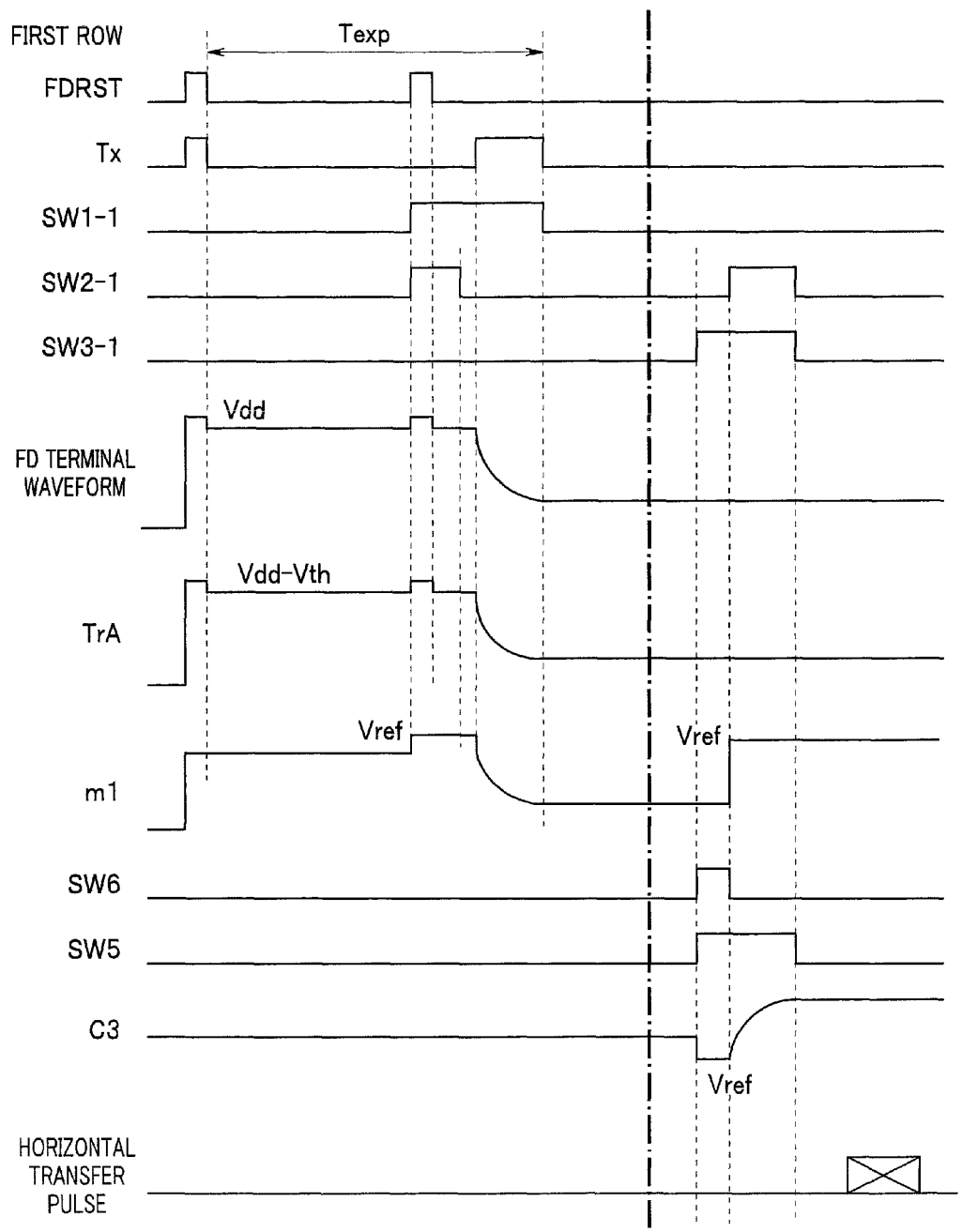
FIG. 6 is a timing chart showing a state of signal changes of a transistor and the like of a pixel in the first row of the pixel section in the reference example.

FIG. 4 is a diagram showing a basic image pickup operation of the image pickup section 2 for obtaining a high dynamic range image. FIG. 5 is a timing chart showing operations in a first row and a second row of the pixel section 21. FIG. 6 is a timing chart showing a state of signal changes of a transistor and the like of a pixel in the first row of the pixel section 21. In FIG. 4, as an example, two kinds of images in different exposure times are acquired.

First, the camera control section 12 set in advance two kinds of times, i.e., a long time and a short time as an exposure time Texp on the basis of a photometry result.

The exposure control section 9 causes the image pickup device 2a to reset the photoelectric conversion sections PD of all the pixels of the image pickup device 2a (i.e., a global shutter system) at a point counting back, for example, the long exposure time from rising edge timing of the vertical synchronization signal VD. As explained above, the reset of the photoelectric conversion section PD is performed by simultaneously turning on the FD reset transistor FDRST and the transfer transistor TX (see FIGS. 5 and 6). A point when the FD reset transistor FDRST and the transfer transistor TX are turned off is an exposure start point. After this reset operation, a potential of the signal accumulating section FD is also reset to the voltage source Vdd. An amplified output from the amplification transistor TrA decreases by Vth of TrA to (Vdd−Vth) (see FIG. 6).

Thereafter, at a point before the rising edge timing of the vertical synchronization signal VD, the FD reset transistor FDRST is turned on to reset the signal accumulating section FD and, at the same time, the switch SW2-1 is turned on to reset the memory m1 to the reference voltage Vref shown in FIG. 6. At this point, at the same time, the switch SW1-1 is further turned on, whereby a potential at the other end of the capacitor C1 is reset to the reference voltage Vref and the switch SW1-1 starts sample hold of the potential at the other end of the capacitor C1.

Thereafter, the FD reset transistor FDRST is turned off, whereby the reset of the signal accumulating section FD ends. The reset of the signal accumulating section FD is desirably performed immediately before the end of an exposure time as much as possible in order to further reduce noise due to a leak current.

Subsequently, the switch SW2-1 is turned off to end the reset of the memory m1. At this point, the capacitor C1 clamps an amplified signal (an amplified signal after the reset of the signal accumulating section FD) outputted from the amplification transistor TrA.

Further, thereafter, the transfer transistor TX is turned on, whereby signal charges accumulated in the photoelectric conversion sections PD of all the pixels are transferred to the signal accumulating section FD via the transfer transistor TX and accumulated in the signal accumulating section FD. Consequently, a terminal waveform of the signal accumulating section FD, an output waveform of the amplification transistor TrA, and the potential at the end of the memory m1 change as shown in FIG. 6.

At the rising edge timing of the vertical synchronization signal VD, the transfer transistors TX of all the pixels are turned off, whereby the exposure of all the pixels (the accumulation of the signal charges) collectively (simultaneously) ends.

The switch SW1-1 is turned off simultaneously with the turn-off of the transfer transistor TX, whereby the sample hold of the potential at the other end of the capacitor C1 is finished. In this way, signals accumulated in all the pixels of the pixel section 21 are sample-held in the memory m1.

Thereafter, the exposure control section 9 causes the image pickup section 2 to sequentially read out, in a row unit, the image signals sample-held in the memory m1 via the column processing section 23. Specifically, first, the switch SW3-1, the switch SW5, and the switch SW6 in the first row are turned on, whereby the capacitor C3 is reset to the reference voltage Vref, the potential at the other end of the capacitor C2 is also reset to the reference voltage Vref, and the sample hold is started.

Subsequently, the switch SW6 is turned off and the switch SW2-1 is turned on, whereby a signal accumulated in the memory m1 is reset and a result of the reset is outputted to the vertical signal line 33 via a source follower circuit formed by TrB-1. According to this switch operation, the signal accumulated in the memory m1 is outputted to the vertical signal line 33 as an amount of change in a plus direction and transmitted to the capacitor C3.

Thereafter, the switch SW2-1, the switch SW3-1, and the switch SW5 are turned off, whereby the signal in the memory m1 is sample-held by the capacitor C3.

When a horizontal transfer pulse is applied, the signal accumulated in the capacitor C3 is outputted to the horizontal signal line 27 via the switch SW8.

The signal outputted to the horizontal signal line 27 is, after being amplified by the output amplifier 28, converted into a digital signal and outputted from the image pickup section 2 to the HDR digital combination section 3.

Signals corresponding to the first row of the image signals accumulated in the memory m1 are sequentially outputted to the horizontal signal line and converted into digital signals. When all the signal charges are read out via the horizontal signal line, pixel signals in the second row are read out in the same manner. This is repeated for all the rows, whereby the signal charges of all the pixels can be read out as digital signals.

Such processing is performed by alternately repeating long exposure and short exposure in every vertical synchronization period, whereby a long exposure image and a short exposure image necessary for forming a high dynamic range image are alternately inputted to the HDR digital combination section 3.

Subsequently, embodiments of the present invention are explained with reference to the accompanying drawings.

First Embodiment

Figure 7:
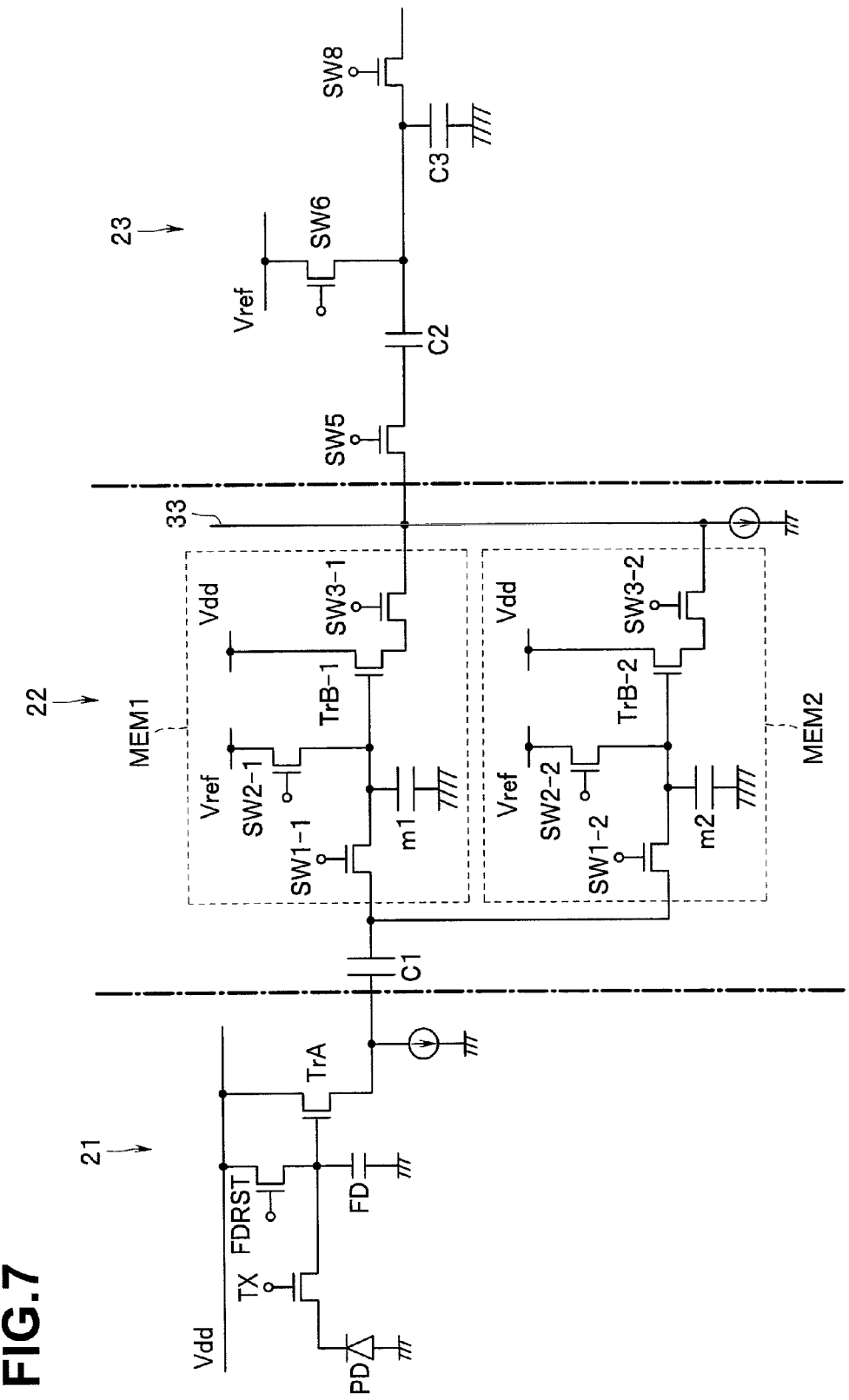
FIG. 7 is a circuit diagram showing a configuration of a pixel section, a memory section, and a column processing section related to one pixel in a first embodiment of the present invention.

FIGS. 7 to 10 show a first embodiment of the present invention FIG. 7 is a circuit diagram showing a configuration of the pixel section 21, the memory section 22, and the column processing section 23 related to one pixel.

First, a basic configuration of an image pickup apparatus according to the present embodiment is the same as the configuration shown in FIG. 1. A basic configuration of the image pickup section 2 in the present embodiment is the same as the configuration shown in FIG. 2.

In the image pickup section 2 in the present embodiment, a configuration of the pixel section 21 and the column processing section 23 is the same as the configuration shown in FIG. 3 except that a first memory section MEM1 and a second memory section MEM2 are provided in the memory section 22.

Specifically, in the memory section 22, the first memory section MEM1 and the second memory section MEM2 are arrayed in parallel at a post stage of the capacitor C1. Output ends of both the first memory section MEM1 and the second memory section MEM2 are connected to the drain terminal of the switch SW5.

The first memory section MEM1 includes the switch SW1-1, the switch SW2-1, the transistor TrB-1, the switch SW3-1, and the memory m1.

Similarly, the second memory section MEM2 includes a switch SW1-2, a switch SW2-2, a transistor TrB-2, a switch SW3-2, and a memory m2.

Structure of the first memory section MEM1 and the second memory section MEM2 is the same as structure of corresponding components in the memory section 22 in FIG. 3.

Figure 8:
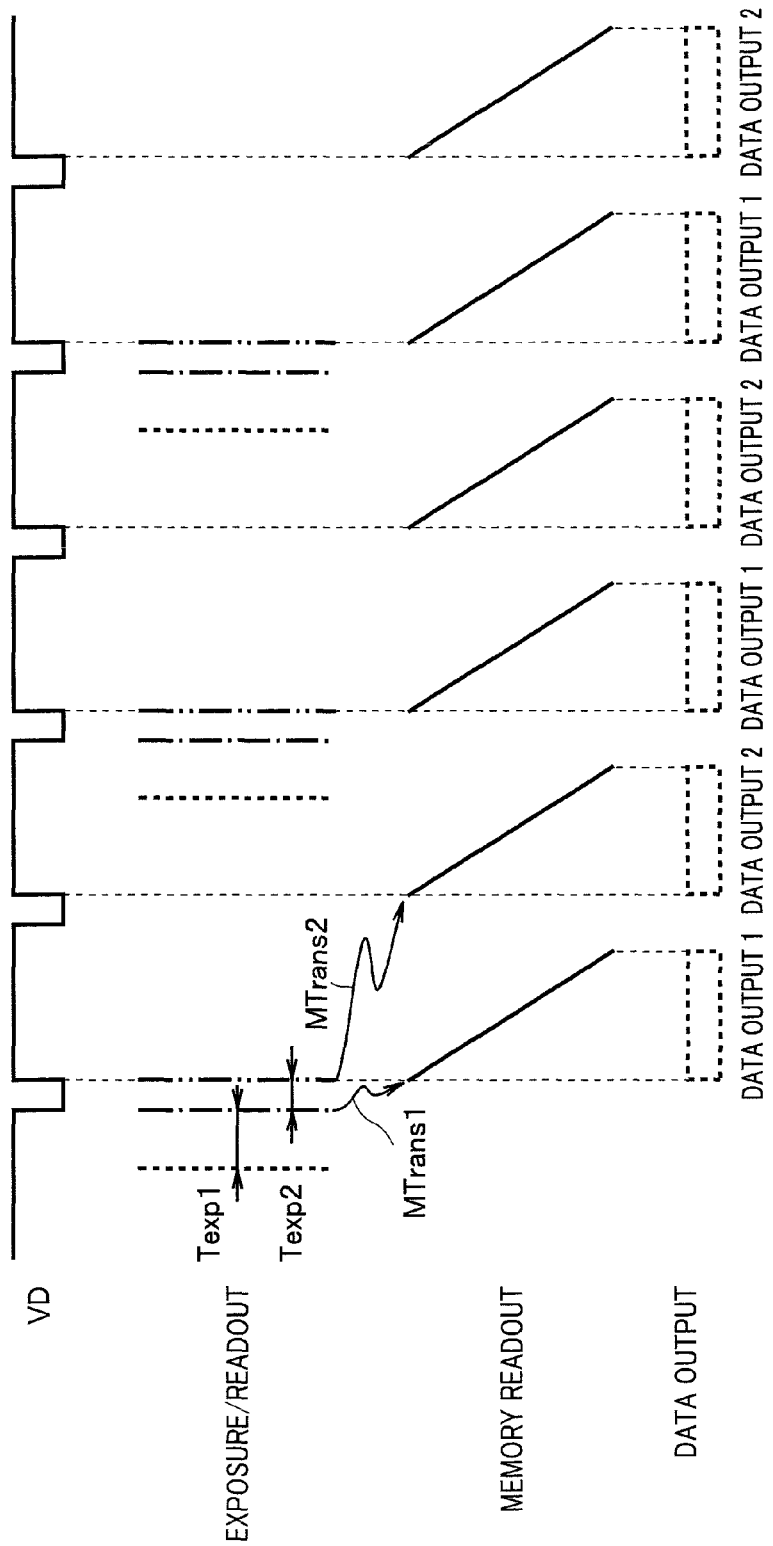
FIG. 8 is a diagram showing an image pickup operation of an image pickup section for obtaining a high dynamic range image in the first embodiment.
Figure 9:
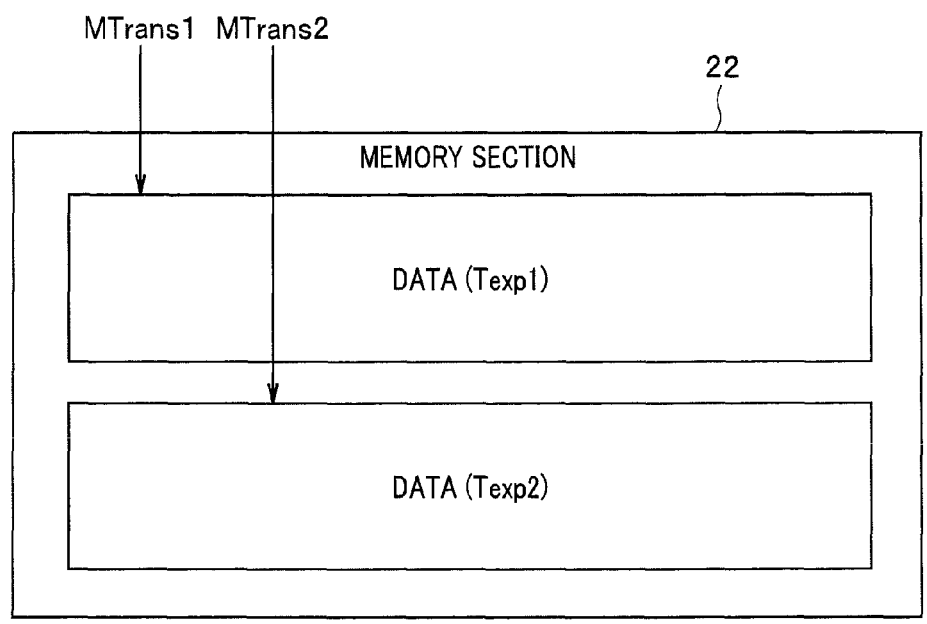
FIG. 9 is a diagram showing a state of transfer of first exposure image data and second exposure image data from the pixel section to the memory section in the first embodiment.
Figure 10:
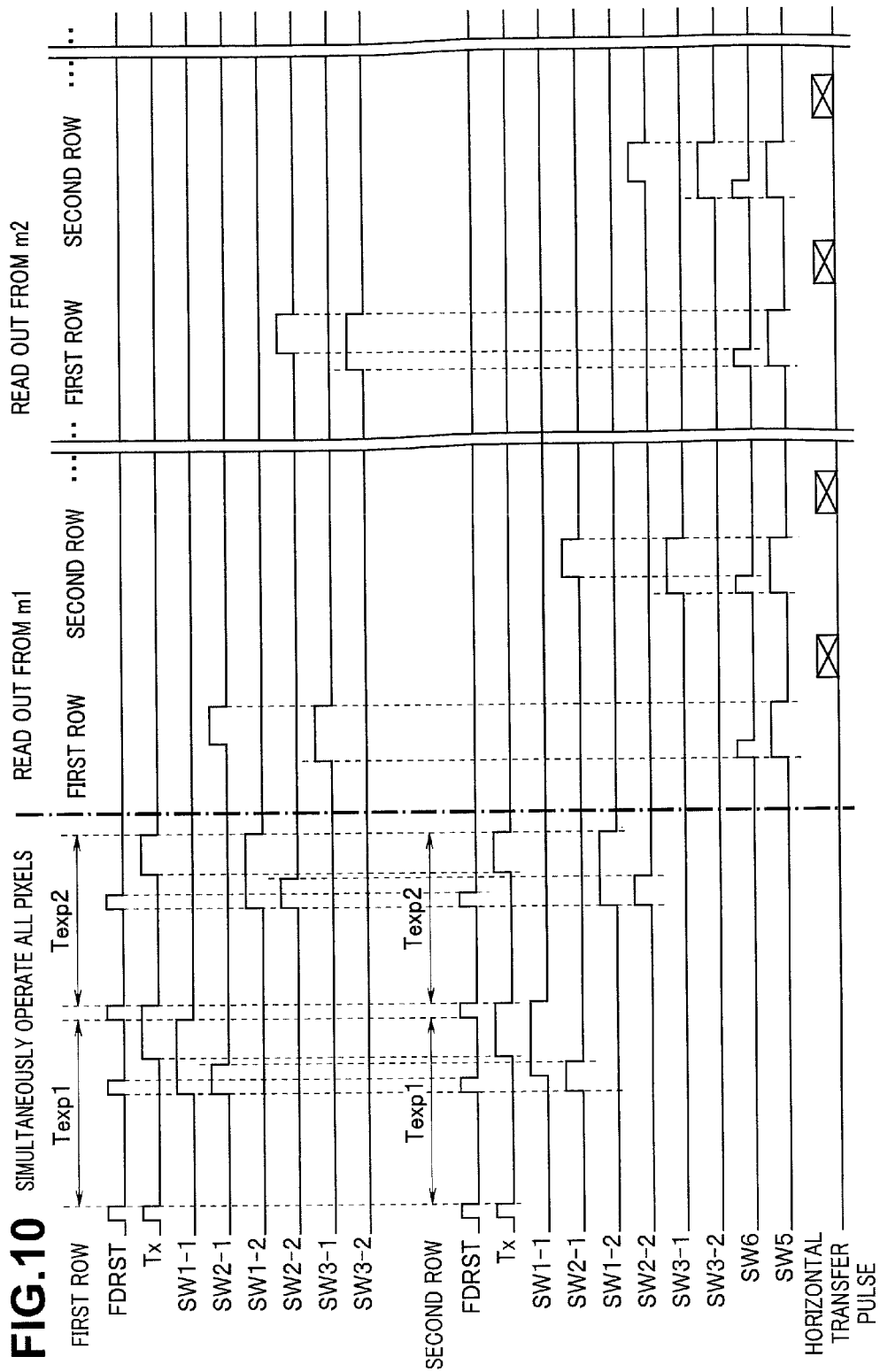
FIG. 10 is a timing chart showing operations in a first row and a second row of the pixel section in the first embodiment.

FIG. 8 is a diagram showing an image pickup operation of the image pickup section 2 for obtaining a high dynamic range image. FIG. 9 is a diagram showing a state of transfer of first exposure image data and second exposure image data from the pixel section 21 to the memory section 22. FIG. 10 is a timing chart showing operations in the first row and the second row of the pixel section 21.

A state of signal changes of the transistor and the like of the pixel in the first row of the pixel section 21 is substantially the same as the state shown in FIG. 6.

In the present embodiment, one exposure time in one vertical synchronization period is divided into continuous two exposure times different from each other, i.e., a first exposure time Texp1 (e.g., a long exposure time) and a second exposure time Texp2 (e.g., a short exposure time). Pixel signals are respectively read out in the first and second exposure times Texp1 and Texp2. The pixel signal read out in the first exposure time Texp1 is analog-transferred to, for example, the first memory section MEM1 of the memory section 22 (MTrans1) and, thereafter, the pixel signal read out in the second exposure time Texp2 is analog-transferred to the second memory section MEM2 of the memory section 22 (MTrans2).

When charges accumulated in the first exposure time Texp1 are transferred to the first memory section MEM1, the switch SW1-1 is turned on and the switch SW1-2 is turned off. When charges accumulated in the second exposure time Texp2 is transferred to the second memory section MEM2, the switch SW1-1 is turned off and the switch SW1-2 is turned on. A method of transferring signals to the memories m1 and m2 is the same as the method explained in the reference example.

A reason for using the expression "continuous two exposure times" instead of "continuing two exposure times" is that, as shown in FIG. 10, since the FD reset transistor FDRST is turned on between the first exposure time Texp1 and the second exposure time Texp2, the exposure times are cut in this pulse period (the same applies below). Therefore, "continuous" can be rephrased as "continuing excluding time equivalent to the pulse period".

Long exposure data stored in the first memory section MEM1 are sequentially read out in a row unit in synchronization with the vertical synchronization signal VD. Short exposure data stored in the second memory section MEM2 are sequentially read out in a row unit in synchronization with the next vertical synchronization signal VD.

In an example shown in FIG. 8, the long exposure is performed first and the short exposure is performed later. However, the long exposure and the short exposure may be performed in the opposite order. Similarly, the long exposure image is read out first and the short exposure image is read out later. However, the long exposure image and the short exposure image may be read out in the opposite order. The exposure order and the readout order may be different.

In the readout method in the reference example explained above, the exposure signals are subjected to the HDR combination on the basis of the images of the two times of exposures performed over the two vertical synchronization periods. Therefore, when the subject moves over the two vertical synchronization periods or a blur due to a hand shake or the like occurs in the two vertical synchronization periods, even if images are normal images without a subject blur (including a blur due to a hand shake as well) in the respective exposures because of appropriate shutter speed setting, an image after the HDR combination is a deteriorated image affected by the blur. However, with the configuration of the first embodiment, if shutter speed is selected such that a subject blur in time obtained by adding up the first exposure time Texp1 and the second exposure time Texp2 (i.e., time shorter than one vertical synchronization time) is sufficiently small or a cause of a blur due to a hand shake or the like is suppressed by the effect of effective hand shake correction or the like in the relatively short time, quality of a high dynamic range image obtained by combining the images is not deteriorated. Therefore, it is possible to easily obtain a higher quality image. Even if deterioration in image quality due to a subject blur occurs, it is possible to significantly suppress the deterioration in the image quality as compared to the case of the reference example.

As explained above, the memory sections equivalent to the number of images in different exposure times to be combined are provided in the memory section 22. Consequently, it is possible to acquire plural images in continuous exposure times close to the same exposure point.

Second Embodiment

Figure 11:
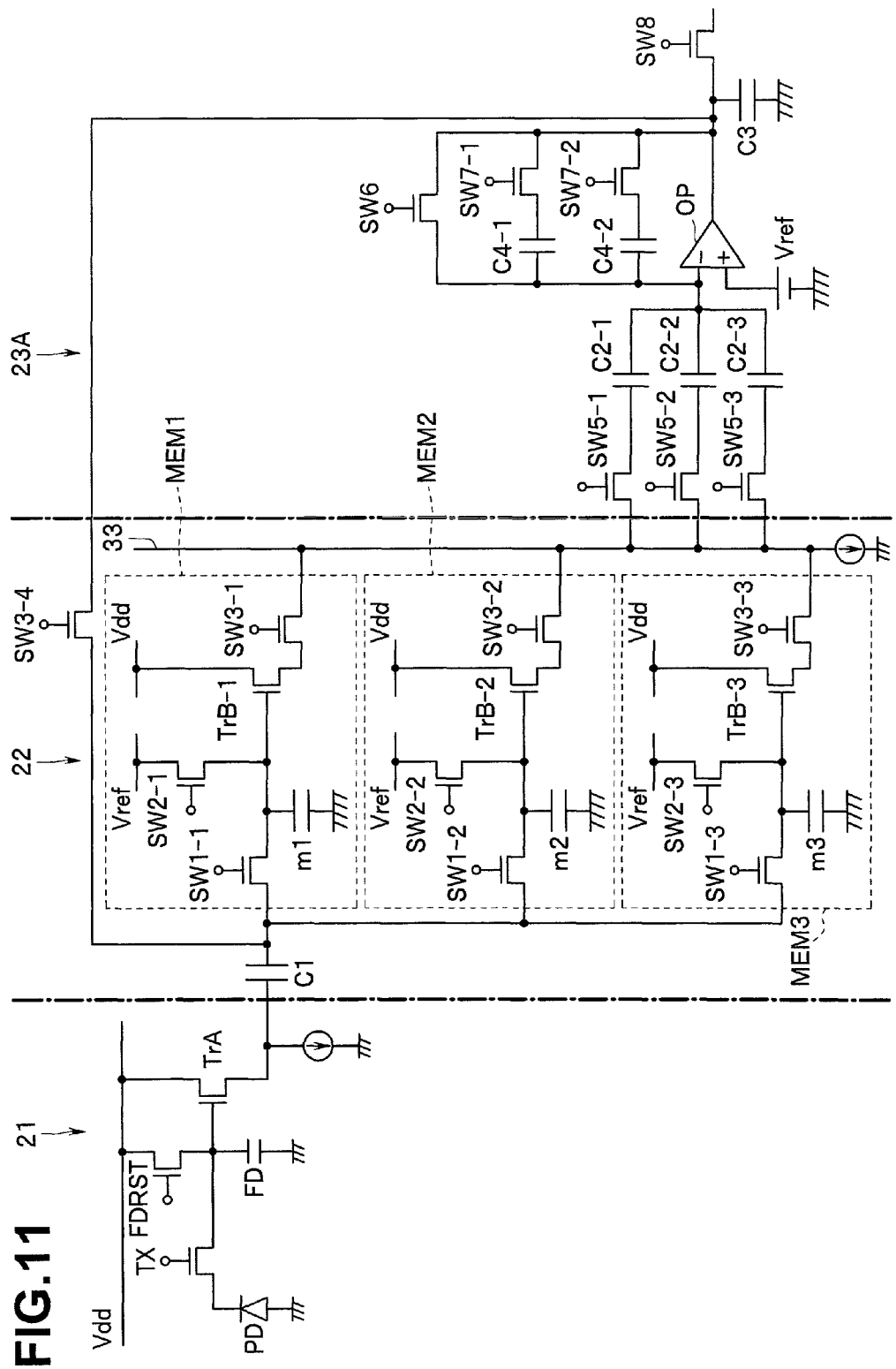
FIG. 11 is a circuit diagram showing a configuration of a pixel section, a memory section, and a column processing section related to one pixel in a second embodiment of the present invention.

FIGS. 11 to 16 show a second embodiment of the present invention. FIG. 11 is a circuit diagram showing a configuration of the pixel section 21, the memory section 22, and a column processing section 23A related to one pixel.

In the second embodiment, components same as those in the first embodiment are denoted by the same reference numerals and signs and explanation of the components is omitted. Only differences from the first embodiment are mainly explained.

First, a basic configuration of an image pickup apparatus according to the present embodiment is the same as the configuration shown in FIG. 1. A basic configuration of the image pickup section 2 in the present embodiment is the same as the configuration shown in FIG. 2 except components denoted by reference numerals and signs in the column processing section 23A.

In the image pickup section 2 in the present embodiment, a configuration of the pixel section 21 is same as the configuration shown in FIG. 3 except that the first memory section MEM1, the second memory section MEM2, and a third memory section MEM3 are provided in the memory section 22 and an averaging operation function and an addition operation function are provided in the column processing section 23A (although the reference numeral 23 is changed to 23A because the additional functions are provided, a column processing section is still a pixel readout control section).

Specifically, in the memory section 22, the first memory section MEM1, the second memory section MEM2, and the third memory section MEM3 are arrayed in parallel at the post stage of the capacitor C1. Output ends of all the first memory section MEM1, the second memory section MEM2, and the third memory section MEM3 are connected to the vertical signal line 33 for each column. The column processing section 23A is connected to the vertical signal line 33 for each column at a drain terminal of a switch SW5-1, a drain terminal of a switch SW5-2, and a drain terminal of a switch SW5-3, all of which are explained below.

The first memory section MEM1 includes the switch SW1-1, the switch SW2-1, the transistor TrB-1, the switch SW3-1, and the memory m1.

Similarly, the second memory section MEM2 includes the switch SW1-2, the switch SW2-2, the transistor TrB-2, the switch SW3-2, and the memory m2.

Further, the third memory section MEM3 includes a switch SW1-3, a switch SW2-3, a transistor TrB-3, a switch SW3-3, and a memory m3.

Structure of the first memory section MEM1, the second memory section MEM2, and the third memory section MEM3 is the same as the structure of the corresponding components in the memory section 22 shown in FIG. 3.

One end of the capacitor C1 of the memory section 22 is connected to one end of the capacitor C3 of the column processing section 23A. A switch SW3-4 is provided in the memory section 22 on a path of this connection. A gate terminal of the switch SW3-4 is connected to the vertical scanning circuit 24. A pulse is supplied to the gate terminal from the vertical scanning circuit 24 and the switch SW3-4 is controlled to be turned on and off.

In the column processing section 23A, the switch SW5-1, the switch SW5-2, and the switch SW5-3 are connected in parallel to be connected to respective output ends of the first memory section MEM1, the second memory section MEM2, and the third memory section MEM3 in each row via the vertical signal line 33. Further, one ends of a capacitor C2-1, a capacitor C2-2, and a capacitor C2-3 are respectively connected in series to the switch SW5-1, the switch SW5-2, and the switch SW5-3. The other ends of the capacitor C2-1, the capacitor C2-2, and the capacitor C2-3 are connected to an inverting input end of an operational amplifier OP. Capacities of the capacitor C2-1, the capacitor C2-2, and the capacitor C2-3 are the same.

A non-inverting input end of the operational amplifier OP is connected to the reference voltage Vref.

An output end and the inverting input end of the operational amplifier OP are further connected to the switch SW6, a switch SW7-1, and a capacitor C4-1, which are disposed in parallel, via a switch SW7-2 and a capacitor C4-2.

The switch SW7-1 and the capacitor C4-1 are used in subjecting respective outputs of the first memory section MEM1, the second memory section MEM2, and the third memory section MEM3 to an averaging operation. A capacity of the capacitor C4-1 is three times as large as the capacity of the capacitor C2-1 and is three times as large as the respective capacities of the capacitor C2-2 and the capacitor C2-3 as well. A result of the averaging operation is stored in the capacitor C3 and stored in any one of the first memory section MEM1, the second memory section MEM2, and the third memory section MEM3 via the switch SW3-4.

The switch SW7-2 and the capacitor C4-2 are a switch and a capacitor for reading out the result of the averaging operation stored in any one of the first memory section MEM1, the second memory section MEM2, and the third memory section MEM3 and performing a tripling operation (more generally, amplifying to a multiple of the number of times of exposures) to thereby obtain a result equivalent to a result of the addition operation. A capacity of the capacitor C4-2 is one third of the capacity of the capacitor C2-1 and is one third of the respective capacities of the capacitor C2-2 and the capacitor C2-3.

The output end of the operational amplifier OP is connected to one end of the capacitor C3 and the drain terminal of the switch SW8.

Gate terminals of the switch SW5-1, the switch SW5-2, the switch SW5-3, the switch SW6, the switch SW7-1, and the switch SW7-2 are connected to the control circuit 26. A pulse is supplied to the gate terminals and the switch SW5-1, the switch SW5-2, the switch SW5-3, the switch SW6, the switch SW7-1, and the switch SW7-2 are controlled to be turned on and off. The gate terminal of the switch SW8 is connected to the horizontal readout circuit 25. A pulse is supplied to the gate terminal and the switch SW8 is controlled to be turned on and off.

Figure 12:
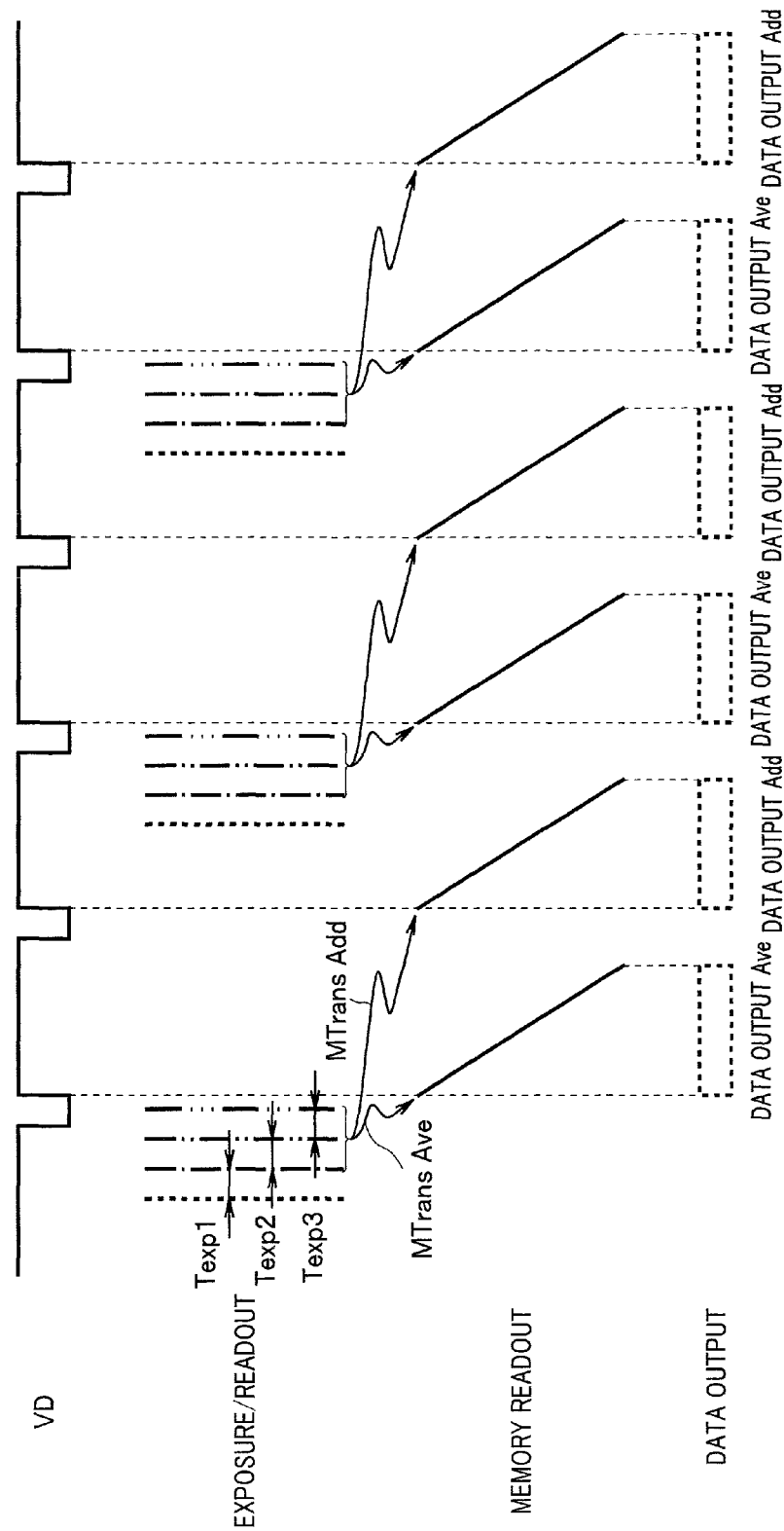
FIG. 12 is a diagram showing an image pickup operation of an image pickup section for obtaining a high dynamic range image in the second embodiment.
Figure 13:
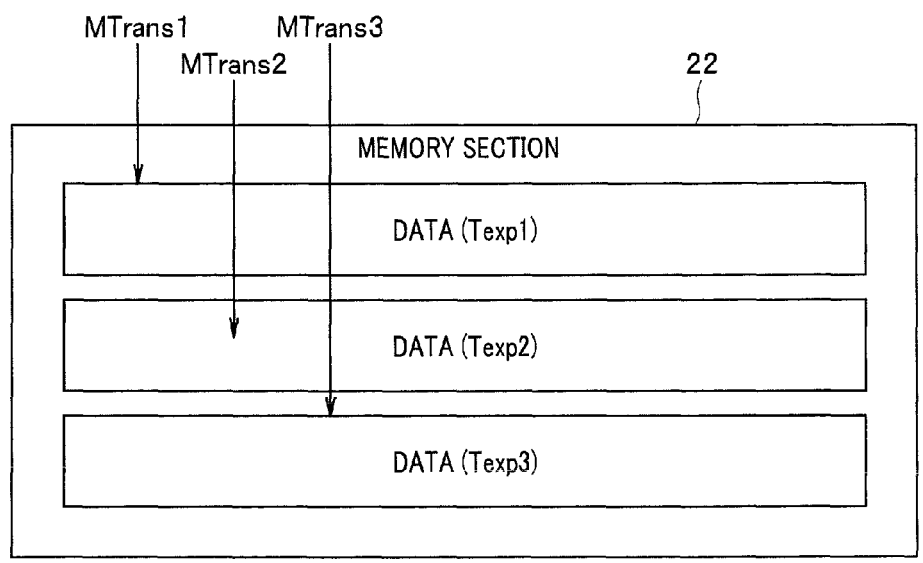
FIG. 13 is a diagram showing a state of transfer of first to third exposure image data from the pixel section to the memory section in the second embodiment.
Figure 14:
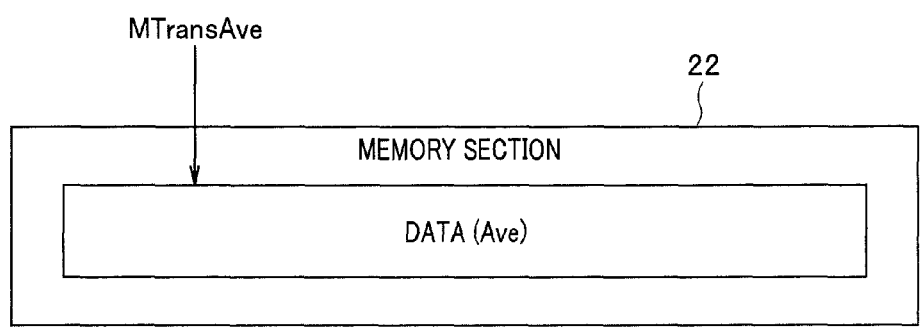
FIG. 14 is a diagram showing a state of transfer of exposure image data subjected to an averaging operation from the column processing section to the memory section in the second embodiment.
Figure 15:
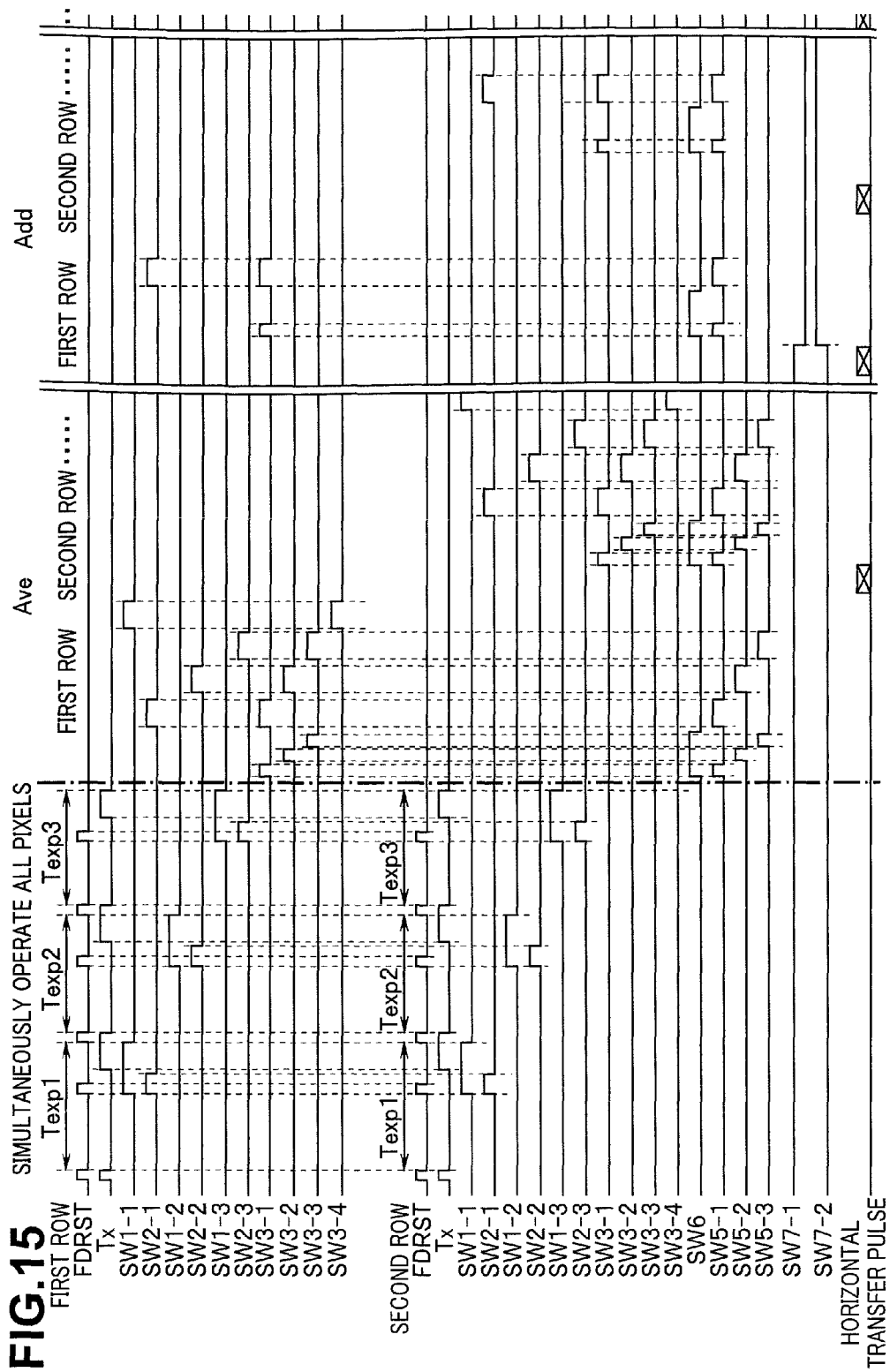
FIG. 15 is a timing chart showing operations in a first row and a second row of the pixel section in the second embodiment.
Figure 16:
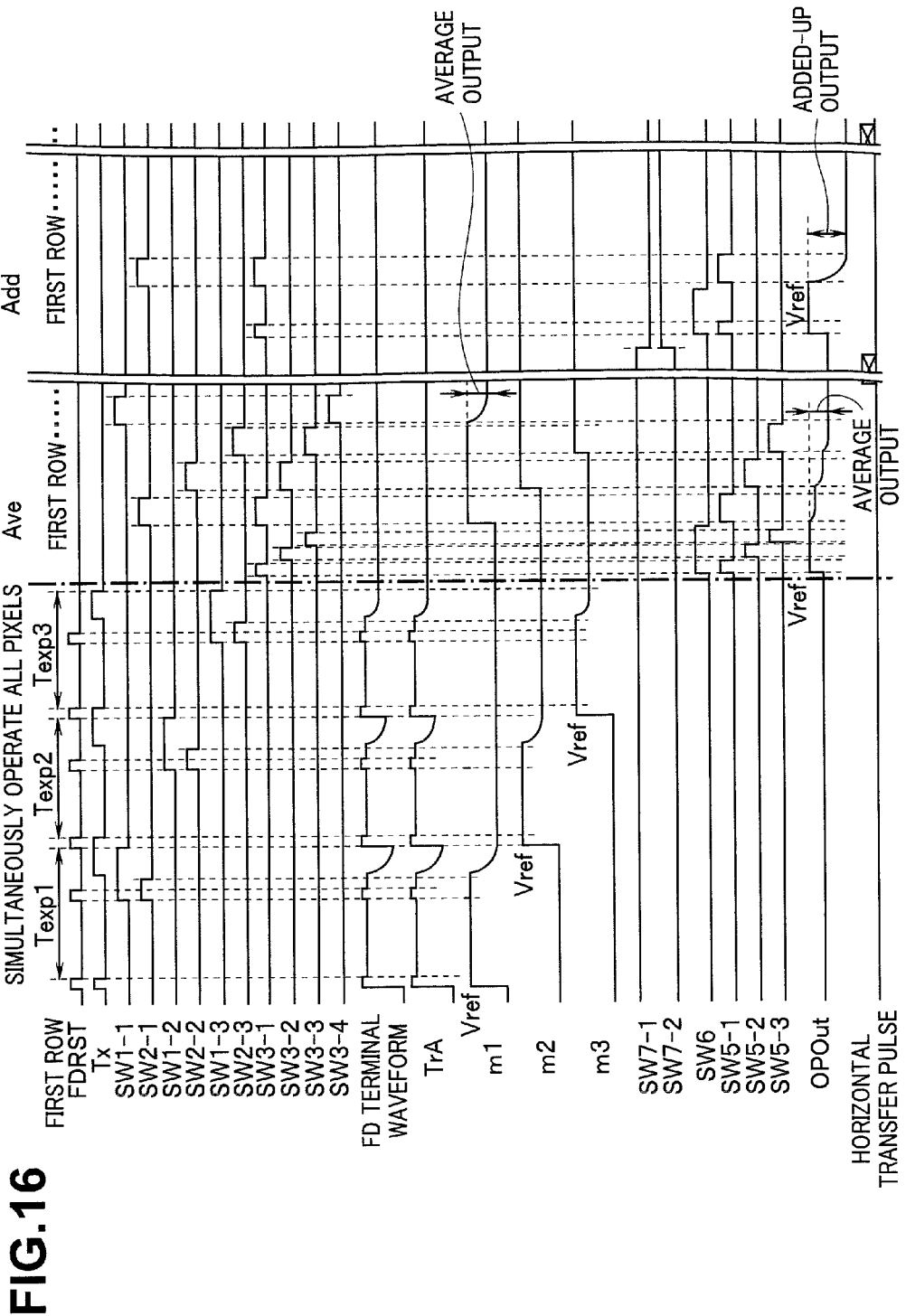
FIG. 16 is a timing chart showing a state of signal changes of a transistor and the like of a pixel in the first row of the pixel section in the second embodiment.

FIG. 12 is a diagram showing an image pickup operation of the image pickup section 2 for obtaining a high dynamic range image. FIG. 13 is a diagram showing a state of transfer of first to third exposure image data from the pixel section 21 to the memory section 22. FIG. 14 is a diagram showing a state of transfer of exposure image data subjected to the averaging operation from the column processing section 23A to the memory section 22. FIG. 15 is a timing chart showing operations in the first row and the second row of the pixel section 21. FIG. 16 is a timing chart showing a state of signal changes of the transistor and the like of the pixel in the first row of the pixel section 21.

In the present embodiment, one exposure time in one vertical synchronization period is divided into continuous plural exposure times (in the shown example, three). Pixel signals are respectively read out in the exposure times. In this case, the one exposure time is, for example, equally divided (i.e., divided into exposure times equal to one another). When the one exposure time is equally divided into three, data (Texp1) obtained by first divided exposure is analog-transferred to, for example, the first memory section MEM1 of the memory section 22 (MTrans1), data (Texp2) obtained by second divided exposure is analog-transferred to the second memory section MEM2 (MTrans2), and data (Texp3) obtained by third divided exposure is analog-transferred to the third memory section MEM3 (MTrans3) (see FIG. 13).

When charges accumulated in the first exposure time Texp1 are transferred to the first memory section MEM1, the switch SW1-1 is turned on and the switch SW1-2 and the switch SW1-3 are turned off (see FIG. 15). When charges accumulated in the second exposure time Texp2 are transferred to the second memory section MEM2, the switch SW1-2 is turned on and the switch SW1-1 and the switch SW1-3 are turned off. Further, when charges accumulated in the third exposure time Texp3 are transferred to the third memory section MEM3, the switch SW1-3 is turned on and the switch SW1-1 and the switch SW1-2 are turned off.

Subsequently, when the averaging operation is performed, first, a reset operation is performed.

Specifically, in a state in which the switch SW7-1 is turned on, the switch SW6 is turned on, whereby the capacitor C3 and the capacitor C4-1 are reset According to this reset operation, the capacitor C3 is reset to a Vref level and a potential difference between both ends of the capacitor C4-1 decreases to 0. While a state in which the switch SW6 is turned on is maintained, the switch SW3-1 and the switch SW5-1 are turned on, whereby the capacitor C2-1 is reset. Similarly, while the state in which the switch SW6 is turned on is maintained, the switch SW3-2 and the switch SW5-2 are turned on, whereby the capacitor C2-2 is reset. The switch SW3-3 and the switch SW5-3 are turned on, whereby the capacitor C2-3 is reset. According to this reset operation, the capacitor C2-1, the capacitor C2-2, and the capacitor C2-3 respectively clamp states in which signals accumulated in the memory m1, the memory m2, and the memory m3 are reflected.

Subsequently, the switch SW2-1, the switch SW3-1, and the switch SW5-1 are turned on, whereby output potential of the operational amplifier OP changes as shown in FIG. 16. When operation for resetting the signal accumulated in the memory m1 to the Vref level by turning on the switch SW2-1 from the reset state explained above is performed, the signal accumulated in the memory m1 is outputted to the vertical signal line 33 as an amount of change in a plus direction. An amount of the increase is multiplied with ⅓ (a capacity ratio of the capacitor C2-1 and the capacitor C4-1) by a circuit including the operational amplifier OP and the capacitor C4-1, changes from the Vref level in a minus direction, and appears in an operational amplifier output.

Subsequently, while a state in which the switch SW7-1 is turned on is maintained, the switch SW2-1, the switch SW3-1, and the switch SW5-1 are turned off and then the switch SW2-2, the switch SW3-2, and the switch SW5-2 are turned on, whereby the output potential of the operational amplifier OP further changes as shown in FIG. 16. According to this operation, the operational amplifier output changes in the minus direction by an amount obtained by further multiplying a signal amount accumulated in the memory m2 with ⅓ and appears in the operational amplifier output.

Further, while the state in which the switch SW7-1 is turned on is maintained, the switch SW2-2, the switch SW3-2, and the switch SW5-2 are turned off and then the switch SW2-3, the switch SW3-3, and the switch SW5-3 are turned on, whereby the output potential of the operational amplifier OP further changes as shown in FIG. 16. According to this operation, an output of the operational amplifier OP appears as an output that changes in the minus direction by an amount obtained by multiplying a signal amount accumulated in the memory m3 with ⅓. Eventually, a signal level changing from Vref in the minus direction obtained by multiplying each of the signal amounts of the memory m1, the memory m2, and the memory m3 with ⅓ appears in an output of the operational amplifier OP. This is equivalent to average calculation. Thereafter, the switch SW2-3, the switch SW3-3, and the switch SW5-3 are turned off.

On the other hand, the switch SW3-4 is turned on, whereby the average from the operational amplifier OP is analog-transferred to the memory section 22 (MTransAve in FIG. 14). For example, the switch SW1-1 is turned on and the switch SW1-2 and the switch SW1-3 are turned off, whereby the average is stored in the memory m1.

Subsequently, an average accumulated in the capacitor C3 is read out and the average is read out for each row via the horizontal signal line 27 and the output amplifier 28. Average processing after transferring an image signal to the first memory section MEM1, the second memory section MEM2, and the third memory section MEM3 is started at the rising edge timing of the vertical synchronization signal VD.

After averages are read out for all the rows, readout of an added-up value is started at the next rising edge timing of the vertical synchronization signal VD.

Then, first, in the same manner as explained above, in a state in which the switch SW7-2 is turned on, the switch SW6 is turned on, whereby the capacitors C3 and the capacitor C4-2 are reset. According to this reset operation, the capacitor C3 is reset to the Vref level and a potential difference between both ends of the capacitor C4-2 decreases to 0. While the state in which the switch SW6 is turned on is maintained, the switch SW3-1 and the switch SW5-1 are turned on, whereby the capacitor C2-1 is reset. Thereafter, the switch SW6 is turned off and the reset operation ends. According to this reset operation, the capacitor C2-1 clamps a state in which the signal of the memory m1 is reflected.

Subsequently, while the state in which the switch SW7-2 is turned on is maintained, the switch SW2-1, the switch SW3-1, and the switch SW5-1 are turned on, whereby an output of the operational amplifier OP changes to a value obtained by tripling the average, i.e., an added-up value. The added-up value is accumulated in the capacitor C3 and read out via the horizontal signal line 27 and the output amplifier 28 for each row.

In the present embodiment, the average is calculated first and then the average is tripled to obtain the added-up value. This is because, through the tripling operation, the added-up value could exceed an upper limit of a signal level that can be treated in the image pickup device. In general, the upper limit of the signal level that can be treated in the image pickup device is slightly larger than a signal level that can be treated by the PD. In other words, when the added-up value is calculated first, in some case, the added-up value hits the upper limit of the signal level that can be treated by the sensor and a correct average cannot be obtained any more even if an average is calculated based on a result of the calculation of the added-up value (the added-up value only has to be divided by 3). Therefore, a more highly reliable result is obtained by calculating the average first.

In the above explanation, the added-up value is obtained on the basis of a result of performing the averaging operation. However, if the circuit may be complicated, an averaging operation circuit and an addition operation circuit can be separately provided to simultaneously process the averaging operation and the addition operation.

Further, when the addition processing is performed plural times, in general, noise is superimposed. The superimposition of noise is predominant in the image pickup section 2 in the present embodiment when noise is superimposed in the memory section 22 and the sections provided at a post stage of the memory section 22. Noise caused by the arithmetic operation such as the averaging operation worsens the noise. However, in general, noise that affects image quality at the time of low sensitivity is shot noise depending on signal charges generated in the PD. Circuit noise does not predominantly affect the image pickup section 2. In other words, at the time of relatively low sensitivity, superimposition of noise due to plural times of data transfer from the photoelectric conversion section PD and addition of the data (i.e., deterioration in image quality) is not at a problematic level. Making use of this advantage, if the readout method in the present embodiment is utilized at low sensitivity at which an accumulation time is relatively long and an image blur tends to occur, it is possible to realize satisfactory HDR combination for a moving subject.

According to the second embodiment explained above, it is possible to realize effects same as those in the first embodiment in that an exposure image in which plural vertical synchronization periods are separated is not obtained when plural images having different signal levels for performing HDR combination are picked up.

In the configuration in the first embodiment, although the long exposure image and the short exposure image are continuously photographed, to be exact, exposure points are different points. Therefore, for example, if a motion of a subject is fast, an image obtained by expanding and combining dynamic ranges is unnatural.

Figure 17:
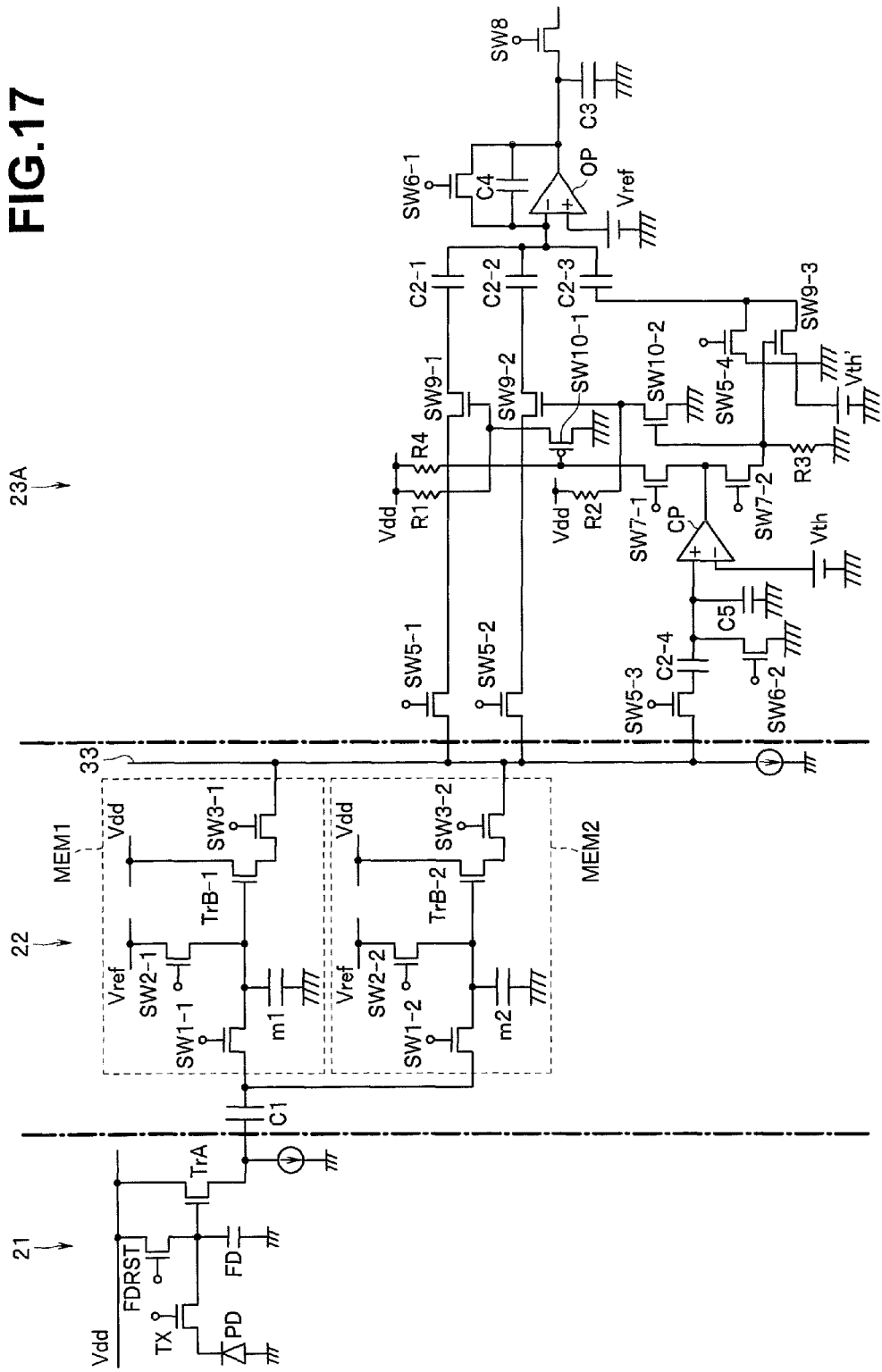
FIG. 17 is a circuit diagram showing a configuration of a pixel section, a memory section, and a column processing section related to one pixel in a third embodiment of the present invention.

On the other hand, according to the second embodiment, plural kinds of images having different signal levels, in the example explained above, the average image having the signal level corresponding to the short exposure image and the added-up value image having the signal level corresponding to the long exposure image are images at the same exposure time. Therefore, an image obtained by expanding and combining dynamic ranges can be a natural image. In particular, in moving image photographing, since continuity of frames is considered important, a more smooth and natural impression is given when shutter speed is set to length of about a frame rate (as a result, a blur occurs) It is possible to comprehensively obtain a satisfactory moving image according to the present embodiment Third Embodiment FIGS. 17 to 25 show a third embodiment of the present invention. FIG. 17 is a circuit diagram showing a configuration of the pixel section 21, the memory section 22, and the column processing section 23A related to one pixel.

In the third embodiment, components same as those in the first and second embodiments are denoted by the same reference numerals and signs and explanation of the components is omitted. Only differences from the first embodiment are mainly explained.

First, a basic configuration of an image pickup apparatus according to the present embodiment is the same as the configuration shown in FIG. 1. A basic configuration of the image pickup section 2 in the present embodiment is the same as the configuration shown in FIG. 2 except components denoted by reference numerals and signs in the column processing section 23A.

In the image pickup section 2 in the present embodiment, a configuration of the pixel section 21 and the memory section 22 is the same as the configuration shown in FIG. 7 except that an HDR combining function based on a comparison operation and an addition operation is provided in the column processing section 23A (the reference numeral 23 is changed to 23A because the additional functions are provided).

Specifically, in the column processing section 23A, the switch SW5-1, the switch SW5-2, and the switch SW5-3 are connected in parallel to be connected to the respective output ends of the first memory section MEM1 and the second memory section MEM2 via the vertical signal line 33.

Among the switches, the switch SW5-1 is connected to one end of the capacitor C2-1 via a switch SW9-1 and the switch SW5-2 is connected to one end of the capacitor C2-2 via a switch SW9-2.

The switch SW5-3 is connected to one end of a capacitor C2-4. The other end of the capacitor C2-4 is connected to a ground via a switch SW6-2 and connected to an inverting input end of a comparator CP and one end of a capacitor C5. The other end of the capacitor C5 is connected to the ground.

A non-inverting input end of the comparator CP is connected to a predetermined determination threshold level Vth. An output end of the comparator CP is connected to a drain terminal of the switch SW7-1 and a drain terminal of the switch SW7-2.

A source terminal of the switch SW7-2 is connected to the ground via a resistor R3. A source terminal of the switch SW7-1 is connected to a gate terminal of the switch SW9-1 via a switch SW10-1. A gate terminal of the switch SW10-1 is connected to the voltage source Vdd via a resistor R4. The gate terminal of the switch SW9-1 is connected to the voltage source Vdd as well via a resistor R1.

The source terminal of the switch SW7-2 is connected to a gate terminal of the switch SW9-2 via a switch SW10-2. The gate terminal of the switch SW9-2 is connected to the voltage source Vdd as well via a resistor R2.

Further, the source terminal of the switch SW7-2 is connected to a gate terminal of a switch SW9-3. A drain terminal of the switch SW9-3 is connected to the predetermined determination threshold level Vth and a source terminal of the switch SW9-3 is connected to the capacitor C2-3. The switch SW9-3 is connected to the ground via a switch SW5-4.

The other ends of the capacitor C2-1, the capacitor C2-2, and the capacitor C2-3 present in positions parallel to one another are connected to the inverting input end of the operational amplifier OP. Capacities of the capacitor C2-1, the capacitor C2-2, and the capacitor C2-3 are the same.

The non-inverting input end of the operational amplifier OP is connected to the reference voltage Vref.

The output end and the inverting input end of the operational amplifier OP are connected via a switch SW6-1 and a capacitor C4 disposed in parallel to each other.

The operational amplifier OP, the switch SW6-1, and the capacitor C4 are used for performing the addition operation. A capacity of the capacitor C4 is the same as the capacity of the capacitor C2-1 and is the same as the capacities of the capacitor C2-2 and the capacitor C2-3.

The output end of the operational amplifier OP is connected to one end of the capacitor C3 and the drain terminal of the switch SW8.

Gate terminals of the switch SW5-1, the switch SW5-2, the switch SW5-3, the switch SW5-4, the switch SW6-1, the switch SW6-2, the switch SW7-1, and the switch SW7-2 are connected to the control circuit 26. A pulse is supplied to the gate terminals and the switch SW5-1, the switch SW5-2, the switch SW5-3, the switch SW5-4, the switch SW6-1, the switch SW6-2, the switch SW7-1, and the switch SW7-2 are controlled to be turned on and off. A gate terminal of the switch SW8 is connected to the horizontal readout circuit 25. A pulse is supplied to the gate terminal from the horizontal readout circuit 25 and the switch SW8 is controlled to be turned on and off.

Figure 18:
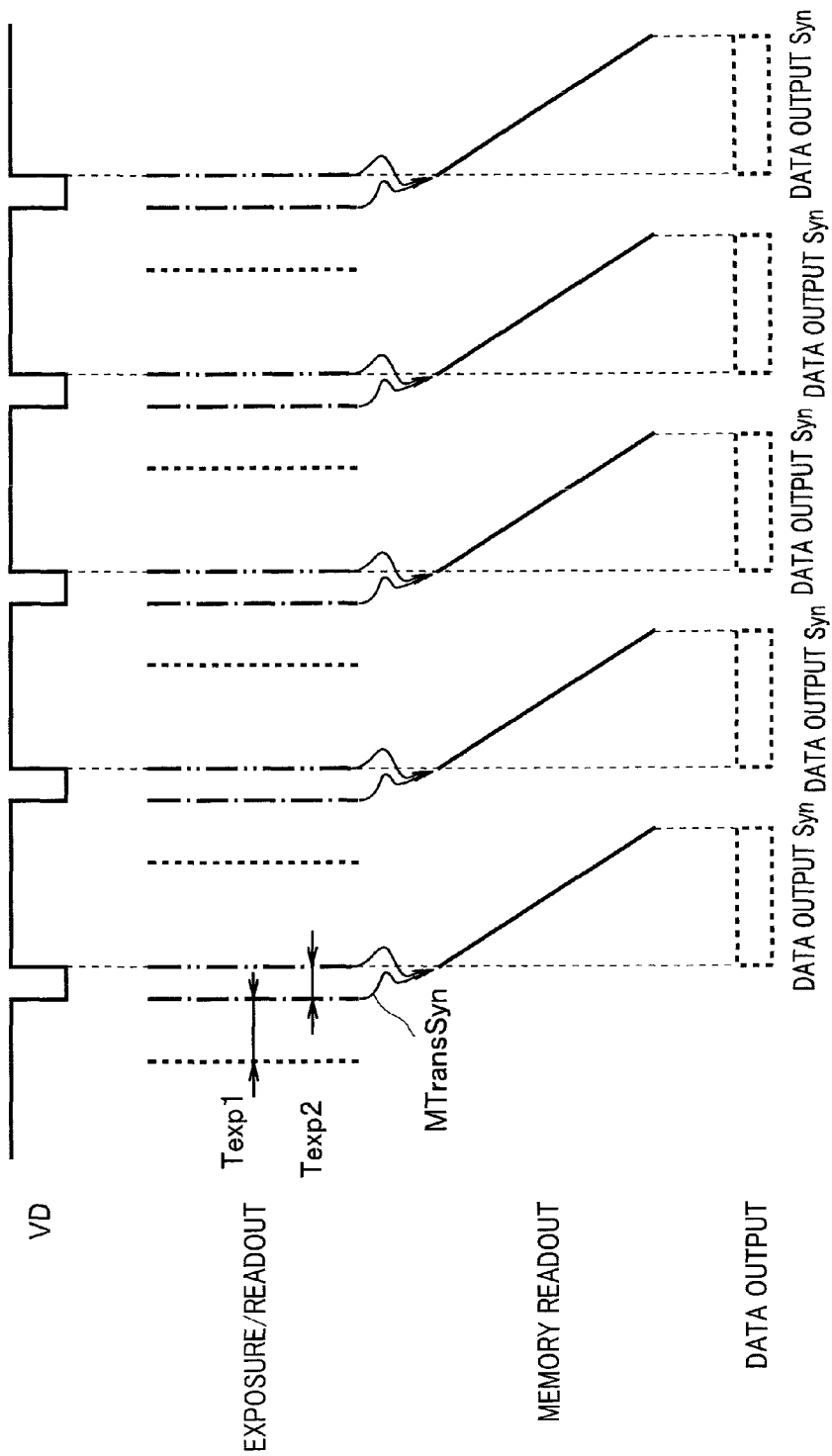
FIG. 18 is a diagram showing an image pickup operation of an image pickup section for obtaining a high dynamic range image in the third embodiment.

FIG. 18 is a diagram showing an image pickup operation of the image pickup section 2 for obtaining a high dynamic range image.

In the present embodiment, as shown in FIG. 18, one exposure time in one vertical synchronization period is divided into continuous two exposure times different from each other, i.e., the first exposure time Texp1 (e.g., a long exposure time) and the second exposure time Texp2 (e.g., a short exposure time). Pixel signals are respectively read out in the first and second exposure times Texp1 and Texp2. According to the processing shown in FIG. 9, the pixel signal read out in the first exposure time Texp1 is analog-transferred to, for example, the second memory section MEM2 of the memory section 22 (MTrans2) and, thereafter, the pixel signal read out in the second exposure time Texp2 is analog-transferred to the first memory section MEM1 of the memory section 22 (MTrans1). This is substantially the same as the first embodiment 1 (in the figure, to match the image pickup operation to timing charts of FIGS. 24 and 25 referred to below, the long exposure image is transferred to the second memory section MEM2 and the short exposure image is transferred to the first memory section MEM1. However, naturally, the long exposure image may be transferred to the first memory section MEM1 and the short exposure image may be transferred to the second memory section MEM2).

Thereafter, in the column processing section 23A, the long exposure image stored in the second memory section MEM2 of the memory section 22 and the short exposure image stored in the first memory section MEM1 are subjected to simple HDR combination in synchronization with the rising edge timing of the vertical synchronization signal VD and outputted from the image pickup section 2. Therefore, in the configuration in the present invention, one high dynamic range image is outputted for each one vertical synchronization period. Unlike the first and second embodiments, a frame rate is not reduced. After being outputted from the image pickup device, a result of the simple HDR combination carried out in the column processing section 23A is appropriately processed by the HDR digital combination section 3 of the camera and changed to a final HDR combined image.

Figure 19:
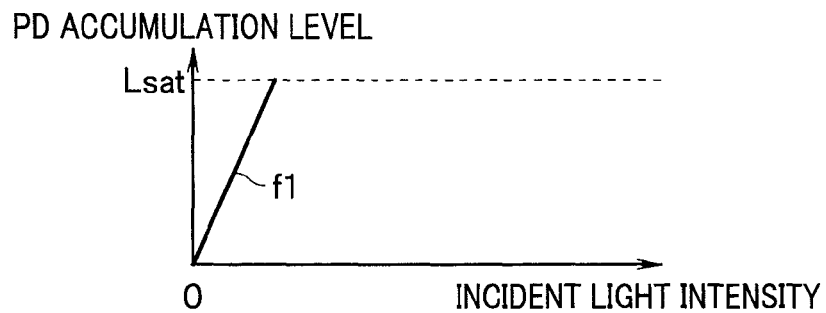
FIG. 19 is a graph showing a charge accumulation amount of a photoelectric conversion section with respect to incident light intensity in a long exposure time in the third embodiment.
Figure 20:
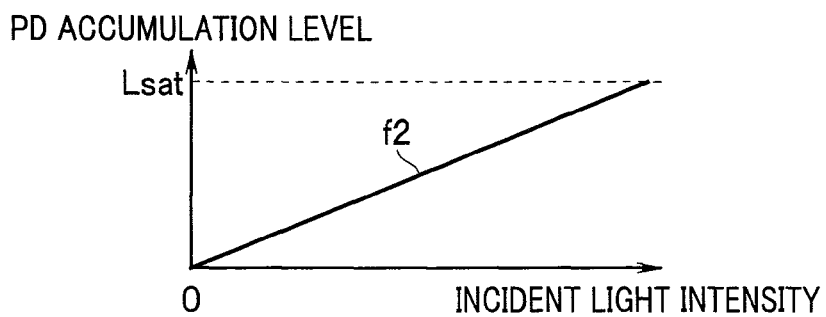
FIG. 20 is a graph showing a charge accumulation amount of the photoelectric conversion section with respect to incident light intensity in a short exposure time in the third embodiment.
Figure 21:
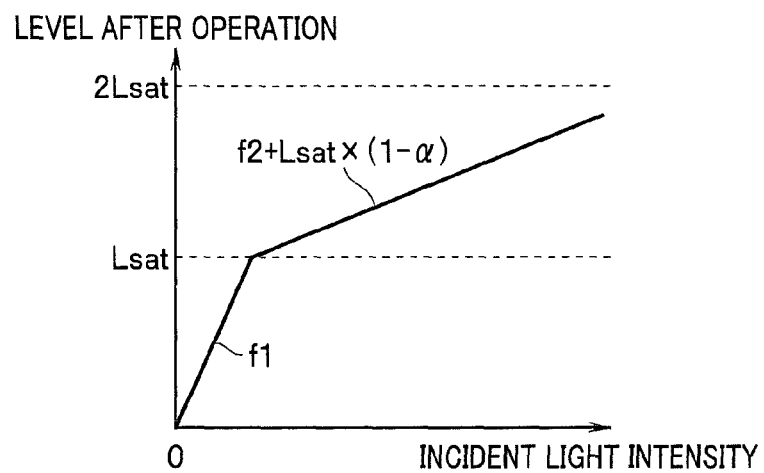
FIG. 21 is a graph showing an output level obtained when a long exposure image and a short exposure image are subjected to simple HDR combination in the column processing section with a saturation level of the photoelectric conversion section set to a predetermined threshold level in the third embodiment.
Figure 22:
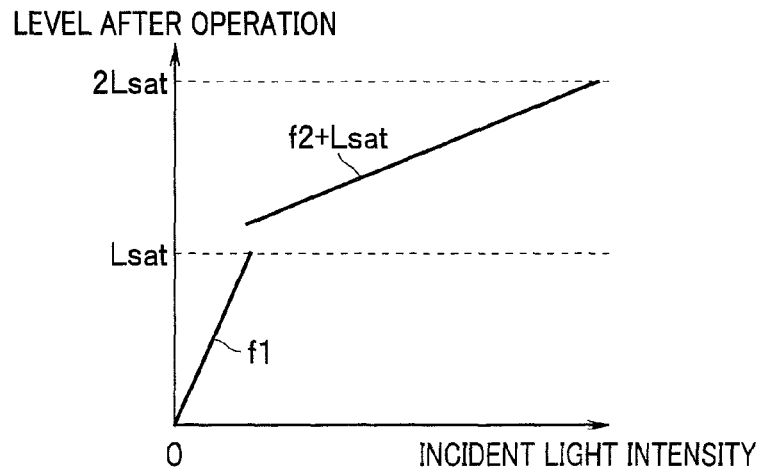
FIG. 22 is a graph showing an output level obtained when a long exposure image and a short exposure image are subjected to the simple HDR combination in a more simplified manner in the column processing section with the saturation level of the photoelectric conversion section set to the predetermined threshold level in the third embodiment.
Figure 23:
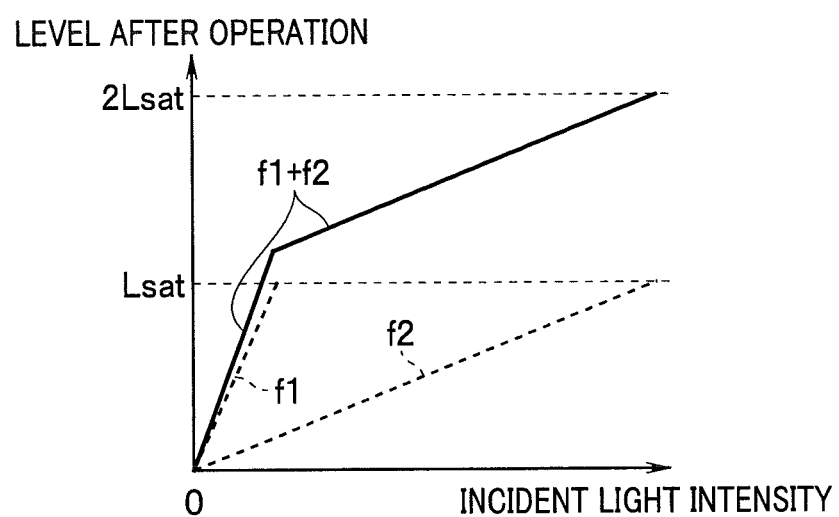
FIG. 23 is a graph showing an output level obtained when a long exposure image and a short exposure image are subjected to simple addition to thereby be subjected to the simple HDR combination in the column processing section in the third embodiment.

An overview of the simple HDR combination in the column processing section 23A is explained with reference to FIGS. 19 to 23. FIG. 19 is a graph showing a charge accumulation amount of the photoelectric conversion section PD with respect to incident light intensity in a long exposure time. FIG. 20 is a graph showing a charge accumulation amount of the photoelectric conversion section PD with respect to incident light intensity in a short exposure time. FIG. 21 is a graph showing an output level obtained when a long exposure image and a short exposure image are subjected to the simple HDR combination in the column processing section with a saturation level of the photoelectric conversion section PD set to a predetermined threshold level. FIG. 22 is a graph showing an output level obtained when a long exposure image and a short exposure image are subjected to the simple HDR combination in a more simplified manner in the column processing section with the saturation level of the photoelectric conversion section PD to the predetermined threshold level. FIG. 23 is a graph showing an output level obtained when a long exposure image and a short exposure image are subjected to simple addition to thereby be subjected to the simple HDR combination in the column processing section.

In the long exposure time, as indicated by a curve f1 in FIG. 19, the charge accumulation amount of the photoelectric conversion section PD with respect to the incident light intensity reaches a saturation level Lsat with relatively weak incident light intensity. On the other hand, in the short exposure time, as indicated by a curve f2 in FIG. 20, the charge accumulation amount of the photoelectric conversion section PD with respect to the incident light intensity does not reach the saturation level Lsat unless the incident light intensity is higher than the incident light intensity in the long exposure time. Therefore, a gradient of the curve f1 is larger than a gradient of the curve f2 (although the curve f1 and the curve f2 are not always a liner function, tilts of the curve f1 and the curve f2 approximated to the linear function are compared).

Concerning a range in which the incident light intensity is low, the long exposure image satisfactorily represents a gradation. Concerning a range in which the incident light intensity is high, only the short exposure image can represent a gradation. Therefore, FIG. 21 shows an example of the simple HDR combination in which the saturation level Lsat of the photoelectric conversion section PD (actually, a level slightly lower than a perfect saturation level (e.g., a value of 90% or 85% of the perfect saturation level) is selected) is set as the predetermined threshold level, the curve f1 is used concerning a range in which the charge accumulation amount does not reach the saturation level Lsat, and an output is the curve f2 concerning a range in which the charge accumulation amount is equal to or higher than the saturation level Lsat. To output a signal from the image pickup device while keeping continuity as shown in FIG. 21 with the range of the output equal to or higher than the saturation level Lsat set to the output of the curve f2, the output needs to be f2+Lsat×(1−α), where α=short exposure time/long exposure time.

Examples of the simple HDR combination performed in a more simplified manner are shown in FIGS. 22 and 23.

In FIG. 22, a range of an output equal to or higher than the saturation level Lsat is set as the output of the curve f2. However, in this case, the curve f2 is simply generated by processing of f2+Lsat (this is simplification of the circuit (as explained below), continuity is lost. Even if such an output is performed from the image pickup device, it is sufficiently possible to appropriately perform HDR combination in the HDR digital combination section 3 of the camera. This is because Lsat is set as a threshold and an output equal to or smaller than Lsat and an output larger than Lsat are respectively clearly separated as a long exposure accumulation output and a short exposure output.

In the long exposure time, as indicated by the curve f1 in FIG. 19, the charge accumulation amount of the photoelectric conversion section PD with respect to the incident light intensity remains at a level near the saturation level Lsat after reaching the saturation level Lsat because charges generated by reception of incident light are leaked to the substrate side.

Therefore, in an example shown in FIG. 23, a long exposure image and a short exposure image are simply added up in the column processing section 23A, whereby the simple HDR combination is performed. When a ratio of the short exposure time to the long exposure time is small (e.g., in the case of ¼, ⅛, 1/16, etc.), even if the long exposure image reaches the saturation level Lsat, a level of the short exposure image remains at a relatively low level. Therefore, when the long exposure image is at a level equal to or lower than the saturation level Lsat, an addition result of (f1+f2) is relatively approximate to f1. When the long exposure image is at a level equal to or higher than the saturation level Lsat, since the addition result of (f1+f2) is approximate to (f1+Lsat), a value near a simple HDR combination result shown in FIG. 21 can be obtained. Therefore, when the ratio of the short exposure time to the long exposure time is small, a relatively satisfactory simple HDR combination result can be obtained even if means for simple addition shown in FIG. 23 is used.

Such simple HDR combinations shown in FIGS. 21, 22, and 23 are performed in the column processing section 23A. In order to perform any one of the simple HDR combinations, it is necessary to set a maximum of a signal level treated by the image pickup device equal to or larger than a double of a signal level of the PD (photodiode).

Figure 24:
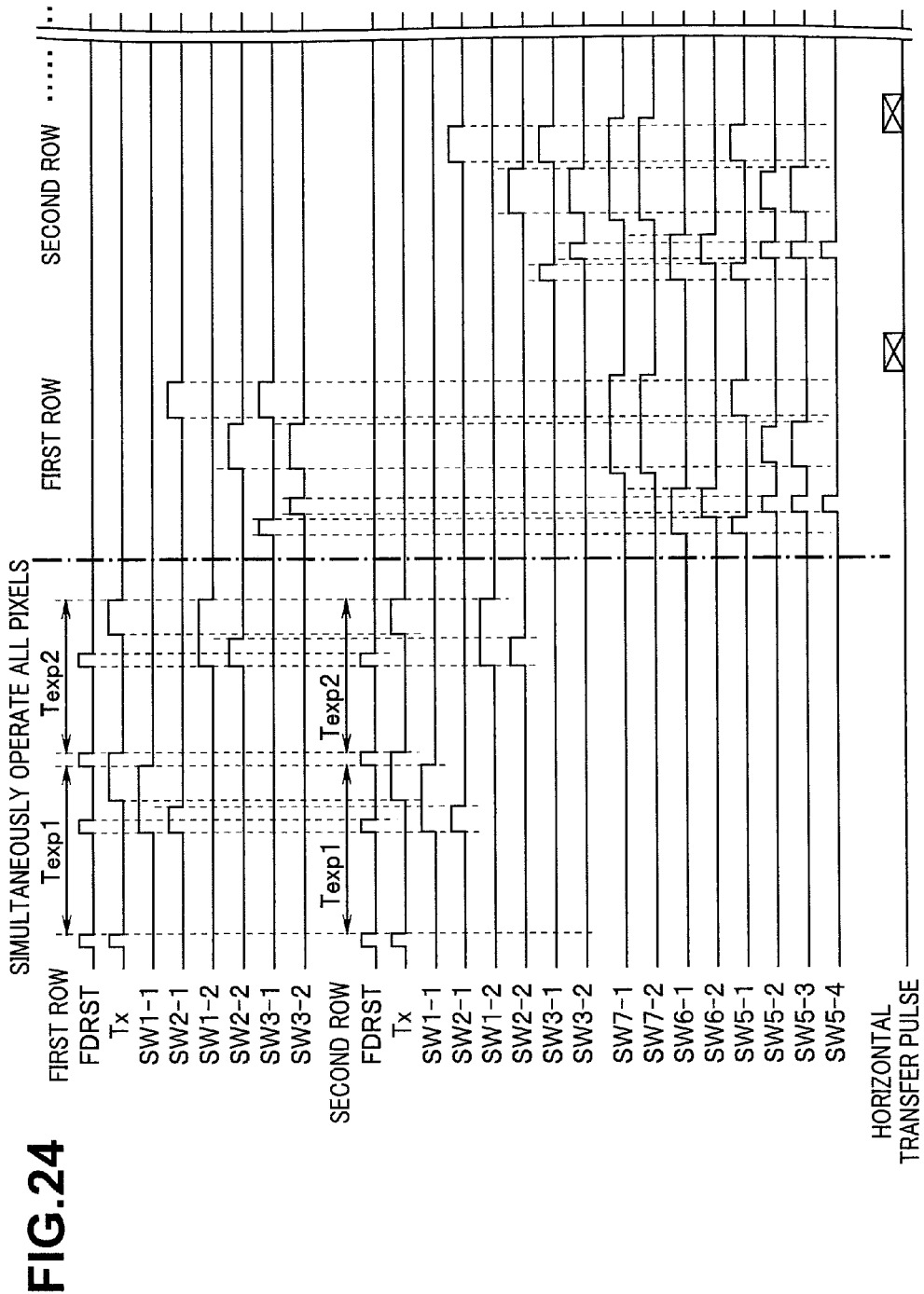
FIG. 24 is a timing chart showing operations in a first row and a second row of the pixel section in the third embodiment.
Figure 25:
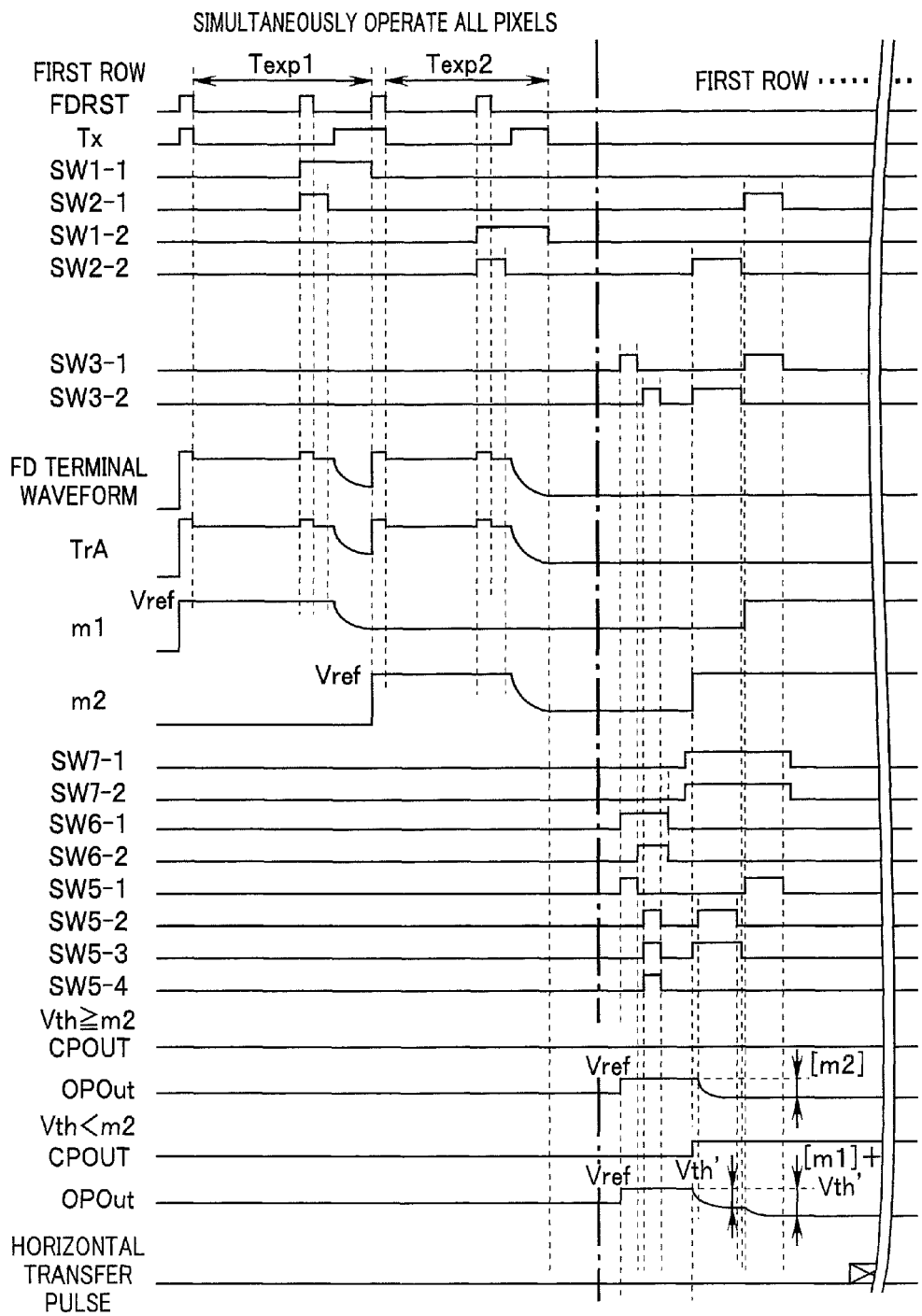
FIG. 25 is a timing chart showing a state of signal changes of a transistor and the like of a pixel in the first row of the pixel section in the third embodiment.
Figure 26:
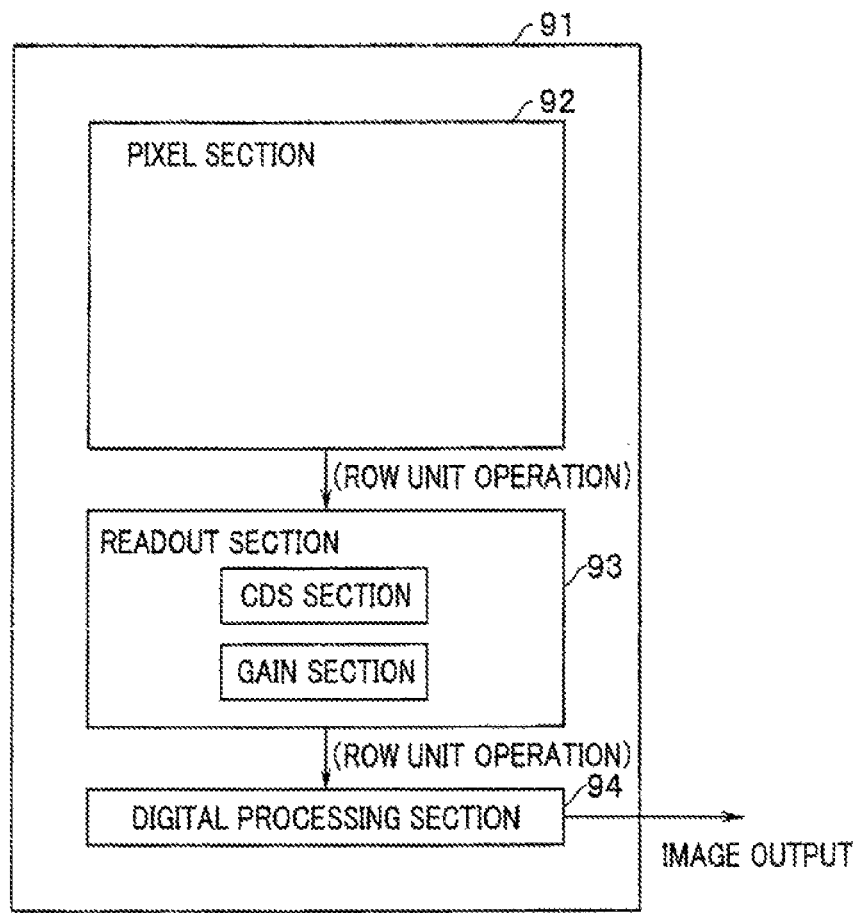
FIG. 26 is a diagram showing an example of a configuration of a conventional image pickup section.
Figure 27:
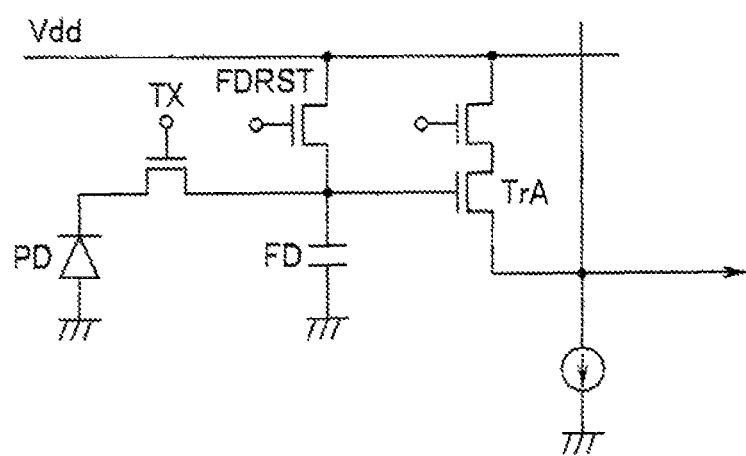
FIG. 27 is a circuit diagram showing a configuration of one pixel in the conventional image pickup section.
Figure 28:
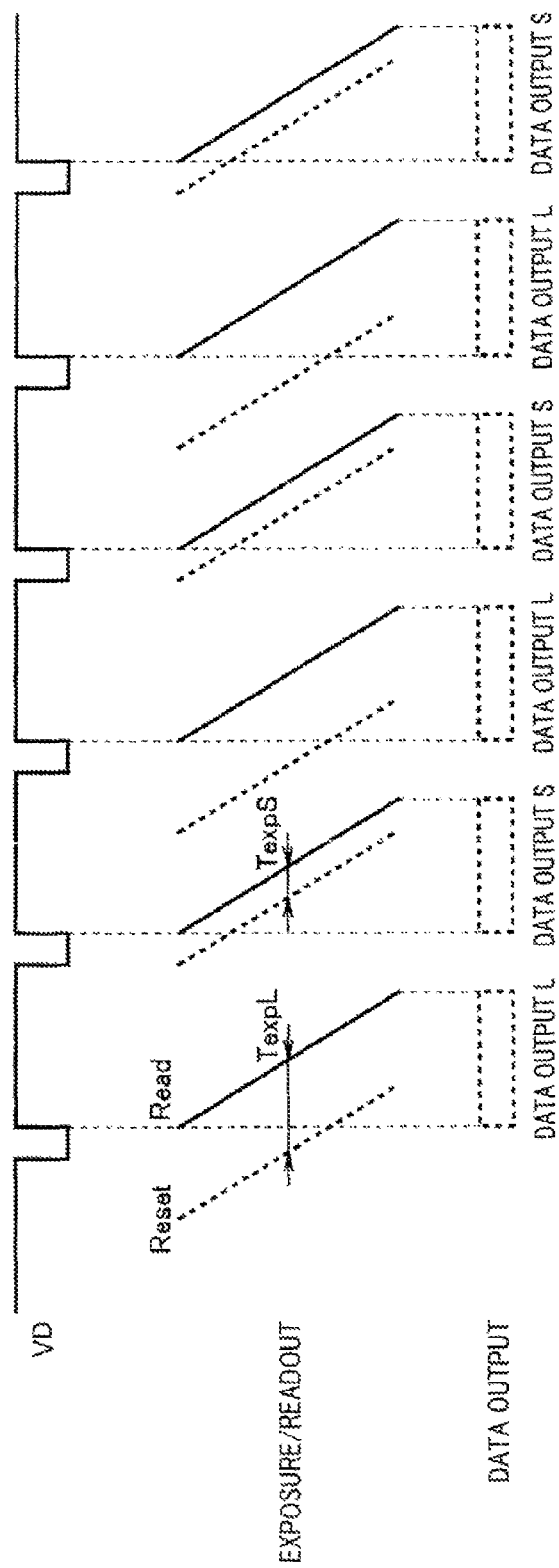
FIG. 28 is a timing chart showing a state in which a long exposure image and a short exposure image are alternately acquired frame by frame by the conventional image pickup section.

FIG. 24 is a timing chart showing operations in the first row and the second row of the pixel section 21. FIG. 25 is a timing chart showing a state of signal changes of the transistor and the like of the pixel in the first row of the pixel section 21. The configuration shown in FIG. 17 and the processing shown in FIGS. 24 and 25 correspond to the simple HDR combination shown in FIG. 21. Correspondence to FIG. 22 is attained by a simple circuit for equalizing Vth' in FIG. 17 to Vth. Correspondence to FIG. 23 is attained by a circuit similar to the circuit for the average processing explained in the second embodiment because an addition of data of the long exposure time and data of the short exposure time only has to be performed (the average processing is weighted addition processing).

First, operations from the long exposure and the short exposure to the transfer from the pixel section 21 to the memory section 22 are the same as the operations in the first embodiment explained above.

Specifically, when image data is read out from the memory section 22, the switch SW6-1 is turned on and the switch SW3-1 and the switch SW5-1 are turned on. Consequently, the capacitor C4 is reset. At this point, since the switch SW7-1 and the switch SW7-2 are off, the switch SW9-1 is in the ON state. According to this switch operation, one end of the capacitor C2-1 is reset to the Vref level by an operation of the OP amplifier and the capacitor C2-1 clamps an amplified signal outputted from the amplification transistor TrB-1 (an amplified signal of the signal stored in the memory m1).

Subsequently, while a state in which the switch SW6-1 is turned on is maintained, the switch SW3-1 and the switch SW5-1 are turned off to turn on the switch SW6-2.

Further, while a state in which the switch SW6-1 and the switch SW6-2 are turned on is maintained, the switch SW3-2, the switch SW5-2, the switch SW5-3, and the switch SW5-4 are turned on. At this point, since the switch SW7-1 and the switch SW7-2 are still off, the switch SW9-2 is in the ON state. According to this switch operation, one end of the capacitor C2-2 is reset to the Vref level by an operation of the operational amplifier and the capacitor C2-2 clamps an amplified signal outputted from the amplification transistor TrB-2 (an amplified signal of the signal stored in the memory m2). Similarly, one end of the capacitor C2-3 is reset to the Vref level by an operation of the operational amplifier and the capacitor C2-3 clamps a ground level according to a switch operation of the switch SW5-4. Further, one end of the capacitor C2-4 and the capacitor C5 is reset to the ground level by a switch operation of the switch SW6-2 and the capacitor C2-4 clamps an amplified signal outputted from the amplification transistor TrB-2 (an amplified signal of the signal stored in the memory m2).

Thereafter, while a state in which the switch SW6-1 and the switch SW6-2 are turned on is maintained, the switch SW3-2, the switch SW5-2, the switch SW5-3, and the switch SW5-4 are turned off.

Further, thereafter, the switch SW6-1 and the switch SW6-2 are turned off.

Subsequently, the switch SW7-1 and the switch SW7-2 are turned on.

While a state in which the switch SW7-1 and the switch SW7-2 are turned on is maintained, the switch SW2-2, the switch SW3-2, and the switch SW5-3 are turned on According to this switch operation, the signal stored in the memory m2 is reset to the Vref level and a change in a plus direction appears at a connection end of the capacitor C2-4 with the comparator CP by the signal amount stored in the memory m2. This voltage is stored in the capacitor C5. The comparator CP outputs, as a comparator CP output, a result obtained by comparing the Vth level and the signal level stored in the memory m2. When the comparator CP output is decided, ON or OFF state of the switch SW9-1 and the switch SW9-2 is decided. Further, ON or OFF of the switch SW9-3 is decided. At this point, when the switch SW9-3 is turned on, a Vth' level appears on the switch SW9-3 connection end side of the capacitor C2-3. The Vth' level is outputted to the operational amplifier OP.

Further, while a state in which the switch SW7-1 and the switch SW7-2, the switch SW2-2, the switch SW3-2, and the switch SW5-3 are turned on is maintained, the switch SW5-2 is turned on. According to this switch operation, if the switch SW9-2 is on as a result of the comparison by the comparator CP, a change in the plus direction appears on the switch SW9-2 connection side of the capacitor C2-2 by the signal amount stored in the memory m2. The signal amount of the memory m2 (which stores a long exposure image signal) is outputted to the operational amplifier OP (the switch SW9-3 is off when a comparator CP output is an output for turning on the switch SW9-2. In other words, by this timing, an output of the comparator CP is decided and it is decided whether an output of the memory m2 is outputted to the operational amplifier OP or Vth' is outputted. For example, when Vth≥memory m2, the operational amplifier OP outputs a memory m2 level).

Thereafter, first, the switch SW5-2 is turned off. Subsequently, the switch SW2-2, the switch SW3-2, and the switch SW5-3 are turned off.

Subsequently, the switch SW2-1, the switch SW3-1, and the switch SW5-1 are turned on. According to this switch operation, if the switch SW9-1 is on as a result of the comparison by the comparator CP, a change in the plus direction appears on the switch SW9-1 connection side of the capacitor C2-1 by the signal amount stored in the memory m1. The signal amount of the memory m1 (which stores a short exposure image signal) is added up with the Vth' level already outputted to the operational amplifier OP and outputted (the switch SW9-3 is on and the Vth' level is outputted to the operational amplifier OP when a comparator CP output is an output for turning on the switch SW9-1. At this point, Vth<memory m2). After a predetermined time elapses, the switch SW2-1, the switch SW3-1, and the switch SW5-1 are turned off. Thereafter, the switch SW7-1 and the switch SW7-2 are turned off.

An overview of action in reading out the long exposure image and the short exposure image from the memory section 22 and subjecting the long exposure image and the short exposure image to the simple HDR combination according to such an operation is as explained below.

First, the long exposure image stored in the second memory section MEM2 is read out. The comparator CP compares the long exposure image with the predetermined determination threshold level Vth corresponding to the saturation level Lsat of the photoelectric conversion section PD.

When the comparator CP determines that a signal value of the long exposure image is smaller than the predetermined determination threshold level Vth, an output of the comparator CP changes to a low level. The comparator CP functions to turn off the switch SW9-1, turn on the switch SW9-2, and turn off the switch SW9-3. Consequently, only a signal value of the long exposure image (a signal value inputted to the operational amplifier OP through the capacitor C2-2) is outputted from the operational amplifier OP.

On the other hand, when the comparator CP determines that the signal value of the long exposure image is equal to or larger than the predetermined determination threshold level Vth, the output of the comparator CP changes to a high level. The comparator CP functions to turn on the switch SW9-1, turn off the switch SW9-2, and turn on the switch SW9-3. Consequently, a value obtained by adding the predetermined determination threshold level Vth (a signal value inputted to the operational amplifier OP through the capacitor C2-3) to a signal value of the short exposure image (a signal value inputted to the operational amplifier OP through the capacitor C2-1) is outputted from the operational amplifier OP.

The operations shown in FIGS. 24 and 25 are performed in the circuit configuration shown in FIG. 17 in this way, whereby the simple HDR combination shown in FIG. 21 is performed by the column processing section 23A.

A high dynamic range image subjected to the simple HDR combination is outputted from the image pickup section 2. More appropriate and detailed combination processing is performed by the HDR digital combination section 3 in the camera. Consequently, a final HDR combination image is generated.

In the above explanation, the long exposure image and the short exposure image are combined. However, this is not a limitation. For example, the simple HDR combination may be performed on the basis of a result of the averaging operation and a result of the addition operation for images related to plural times of exposures explained with reference to the second embodiment.

As an overview of such a modification, processing explained below only has to be performed.

First, the exposure amount control section controls continuous plural times of exposures in one vertical synchronization period to be exposure in exposure times equal to one another and causes the pixel section 21 to perform exposure. As a result, images related to the plural times of exposures are stored in the memory section 22.

Subsequently, the column processing section 23A, which is the memory readout control section, carries out in parallel (simultaneously) the averaging operation and the addition operation for the images related to the plural times of exposures stored in the memory section 22.

The column processing sections 23A compares a pixel signal related to the addition operation with the predetermined determination threshold level Vth. When the pixel signal is lower than the predetermined threshold level Vth, the column processing section 23A outputs the image signal related to the addition operation to the outside. When the pixel signal is equal to or larger than the determination threshold level Vth, the column processing section 23A outputs a result obtained by adding the determination threshold level Vth' to a pixel signal related to the averaging operation to the outside. In this way, an image subjected to the simple HDR combination having the number of frames smaller than the number of times of exposures controlled by the exposure control section only has to be outputted to the outside. A circuit for executing such an operation can be realized by arranging the circuit configuration in the embodiments explained above.

In the first and second embodiments, two 12-bit image data are obtained by A/D-converting (e.g., at 12 bits) each of image signals for two images obtained by plural times (e.g., two times) of exposures.

On the other hand, in the case of the present embodiment, for example, when data by two times of exposures are subjected to the simple HDR combination and read out in one A/D conversion, only one 12-bit image data after the combination is outputted. The 12-bit image data after the combination is, for example, 11-bit two image data when regarded as image data before the combination. Therefore, compared with the first and second embodiments, deterioration in a gradation step in the A/D conversion occurs by 1 bit.

However, a gradation characteristic after the combination is a shape close to a γ characteristic as explained above (see, FIG. 21, 22, or 23). Therefore, in the first place, this is equivalent to raising a signal value on a low level side before performing the A/D conversion. Consequently, since a necessary amount of amplification due to a digital gain at a post stage can be held down, it is possible to absorb the deterioration by 1 bit.

When it is attempted to maintain a gradation of the number of bits similarly to the conventional technique (a gradation of 12 bits in images before the combination) simple, 14-bit A/D conversion only has to be applied to the image signal after the combination in the present embodiment. The 14-bit A/D conversion is a function usually provided in a general-purpose AFE (Analog Front End) in recent years, therefore, it is possible to cope with the 14-bit A/D conversion without adding a special configuration.

According to the third embodiment explained above, plural exposures dispersed in plural vertical synchronization periods are unnecessary to pick up plural images having different signal levels. In this regard, effects same as those in the first and second embodiments can be realized.

Further, according to the third embodiment, making use of the fact that, since the transfer from the pixel section 21 to the memory section 22 is analog, the transfer is fast and an analog signal operation can be performed at high speed, pixel signals related to plural times of exposures are subjected to the simple HDR combination by the analog signal operation and an image after the simple HDR combination is outputted to the outside. Therefore, it is sufficient to output an image having the number of frames smaller than the number of times of exposures controlled by the exposure control section to the outside. Consequently, it is possible to improve a frame rate.

If only the image subjected to the simple HDR combination is outputted in every vertical synchronization period, it is possible to obtain a high dynamic range image without deteriorating the frame rate.

In the configuration explained above, the arithmetic processing such as the addition, the averaging, and the addition based on the threshold is applied to the image signals stored in the memory section 22. However, as the configuration of the image pickup device, it is also possible to attain the arithmetic processing such as the addition, the averaging, and the addition based on the threshold by, in storing image signals in the memory section 22, simultaneously and sequentially performing necessary arithmetic operations (a constant multiplication operation to a pixel being read out from the pixel section, an arithmetic operation between a pixel signal of the memory and a pixel signal being read out from the pixel section, etc.) and storing the image signals in the memory section 22. In this case, the vertical scanning circuit 24 and the column processing section 23 sequentially read out respective pixel signals related to continuous plural times of exposures, while the column processing section 23 performs control for performing necessary arithmetic operations (a constant multiplication operation for weighting, an addition operation of average processing, etc.) and storing the pixel signals in the memory section 22. Consequently, it is possible to reduce a necessary memory size of the memory section (e.g., when an averaging operation for n frames is performed, the memory size is sufficient if a one-frame memory is always present).

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
a pixel section in which plural pixels which generate signal charges corresponding to an exposure amount are arrayed two-dimensionally;
an exposure amount control section that determines an exposure amount of pixel section;
a memory section that can store a pixel signal from the pixel section for plural frames of an output image;
a pixel readout control section that reads out the pixel signal of the pixel section and stores the pixel signal in the memory section; and
a memory readout control section that reads out the pixel signal stored in the memory section,
wherein the exposure amount control section performs control to continuously expose the pixel section to light plural times at equal exposure times in one vertical synchronized period,
wherein the pixel readout control section sequentially reads out respective pixel signals related to continuous plural times of exposures and stores the pixel signals in the memory section, and
wherein the memory readout control section (1) performs an averaging operation for respective images related to the continuous plural times of exposures stored in the memory section or, when the pixel readout control section reads out the pixel signal of the pixel section and stores the pixel signal in the memory section, simultaneously and successively performs the averaging operation for the respective images related to the plural times of exposures to obtain an averaging operation result and outputs the averaging operation result to an outside, (2) performs an addition operation for the respective images related to the continuous plural times of exposures based on the averaging operation result, and (3) performs high dynamic range (HDR) combination based on (i) an image obtained as a result of the averaging operation and (ii) on an image obtained as a result of the addition operation.

2. The image pickup apparatus according to claim 1, wherein the memory readout control section further writes the averaging operation result in the memory section again and thereafter reads out the averaging operation result from the memory section and amplifies the averaging operation result to thereby generate an image equivalent to an addition operation result of the images related to the plural times of exposures and output the image to the outside.

* * * * *